(12) United States Patent
Mishra et al.

(10) Patent No.: US 11,886,478 B2
(45) Date of Patent: Jan. 30, 2024

(54) PERFORMANCE METRIC PREDICTION AND CONTENT ITEM TEXT SUGGESTION BASED UPON CONTENT ITEM TEXT

(71) Applicant: Verizon Media Inc., New York, NY (US)

(72) Inventors: Shaunak Mishra, Jersey City, NJ (US); Changwei Hu, New Providence, NJ (US); Kevin Yen, Jersey City, NJ (US); Manisha Verma, Secaucus, NJ (US); Yifan Hu, Mountain Lakes, NJ (US); Maxim Ivanovich Sviridenko, New York, NY (US); Avinash Chukka, Milpitas, CA (US); Max Edward Beech, Surrey (GB); Chao-Hung Wang, Taipei (TW); Hua-Ying Tsai, Hsinchu (TW); Kamil Michal Zasadzinski, Taipei (TW); Wei Yu Lin, Taipei (TW); Yu Tian, Secaucus, NJ (US)

(73) Assignee: Yahoo Assets LLC, New York, NY (US)

( * ) Notice: Subject to any disclaimer, the term of this patent is extended or adjusted under 35 U.S.C. 154(b) by 126 days.

(21) Appl. No.: 17/314,137

(22) Filed: May 7, 2021

(65) Prior Publication Data

US 2022/0358153 A1 Nov. 10, 2022

(51) Int. Cl.
*G06F 7/00* (2006.01)
*G06F 16/35* (2019.01)
(Continued)

(52) U.S. Cl.
CPC ............ *G06F 16/35* (2019.01); *G06F 16/335* (2019.01); *G06F 18/217* (2023.01); *G06F 18/22* (2023.01); *G06N 20/00* (2019.01)

(58) Field of Classification Search
CPC .. G06F 16/9535; G06F 16/587; G06F 16/535; G06F 16/5838; G06F 16/9537;
(Continued)

(56) References Cited

U.S. PATENT DOCUMENTS 6,101,515 A * 8/2000 Wical .................... G06F 16/353
707/E17.058
10,140,315 B1 * 11/2018 Hohwald .......... G06F 16/24578
(Continued)

*Primary Examiner* — Mohammad A Sana
(74) *Attorney, Agent, or Firm* — Cooper Legal Group LLC

(57) ABSTRACT

One or more computing devices, systems, and/or methods are provided. In an example, a first performance metric score may be determined based upon first content item text. A plurality of similarity scores associated with a plurality of sets of content item text may be determined. One or more sets of content item text may be selected from among the plurality of sets of content item text based upon the plurality of similarity scores and a plurality of performance metric scores associated with the plurality of sets of content item text. The plurality of performance metric scores may comprise one or more performance metric scores associated with the one or more sets of content item text. The one or more performance metric scores may be higher than the first performance metric score. One or more representations of the one or more sets of content item text may be displayed.

20 Claims, 17 Drawing Sheets

(51) Int. Cl.
*G06F 16/335* (2019.01)
*G06N 20/00* (2019.01)
*G06F 18/22* (2023.01)
*G06F 18/21* (2023.01)

(58) Field of Classification Search
CPC .............. G06F 16/583; G06F 16/5866; G06Q 30/0625; G06Q 30/0201; G06Q 30/0202; G06Q 30/0631; G06K 9/6215; G06K 9/6262
See application file for complete search history.

(56) References Cited

U.S. PATENT DOCUMENTS

2022/0198779 A1* 6/2022 Saraee .................. G06Q 50/01
2022/0318880 A1* 10/2022 Saroha ................ G06F 16/9535

\* cited by examiner

US 11,886,478 B2

PERFORMANCE METRIC PREDICTION AND CONTENT ITEM TEXT SUGGESTION BASED UPON CONTENT ITEM TEXT

BACKGROUND

Many services, such as websites, applications, etc. may provide platforms for viewing media. For example, a user may interact with a service. While interacting with the service, selected media may be presented to the user automatically. Some of the media may be advertisements advertising products and/or services associated with a company.

SUMMARY

In accordance with the present disclosure, one or more computing devices and/or methods are provided. In an example, a content item text interface may be displayed via a client device. A first set of content item text may be received via the content item text interface. A first performance metric score may be determined based upon the first set of content item text. A plurality of similarity scores associated with a plurality of sets of content item text may be determined based upon the first set of content item text and the plurality of sets of content item text associated with a plurality of content items. The plurality of sets of content item text may comprise a second set of content item text of a first content item of the plurality of content items. A first similarity score of the plurality of similarity scores may be associated with a similarity between the first set of content item text and the second set of content item text. One or more sets of content item text may be selected from among the plurality of sets of content item text based upon the plurality of similarity scores and a plurality of performance metric scores associated with the plurality of sets of content item text. The plurality of performance metric scores may comprise one or more performance metric scores associated with the one or more sets of content item text. The one or more performance metric scores may be higher than the first performance metric score. A content item text suggestion interface comprising one or more representations of the one or more sets of content item text may be displayed via the client device.

In an example, a first set of content item text may be received from a client device. A first performance metric score may be determined based upon the first set of content item text. A plurality of similarity scores associated with a plurality of sets of content item text may be determined based upon the first set of content item text and the plurality of sets of content item text associated with a plurality of content items. The plurality of sets of content item text may comprise a second set of content item text of a first content item of the plurality of content items. A first similarity score of the plurality of similarity scores may be associated with a similarity between the first set of content item text and the second set of content item text. One or more sets of content item text may be selected from among the plurality of sets of content item text based upon the plurality of similarity scores and a plurality of performance metric scores associated with the plurality of sets of content item text. The plurality of performance metric scores may comprise one or more performance metric scores associated with the one or more sets of content item text. The one or more performance metric scores may be higher than the first performance metric score. One or more representations of the one or more sets of content item text may be displayed via the client device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
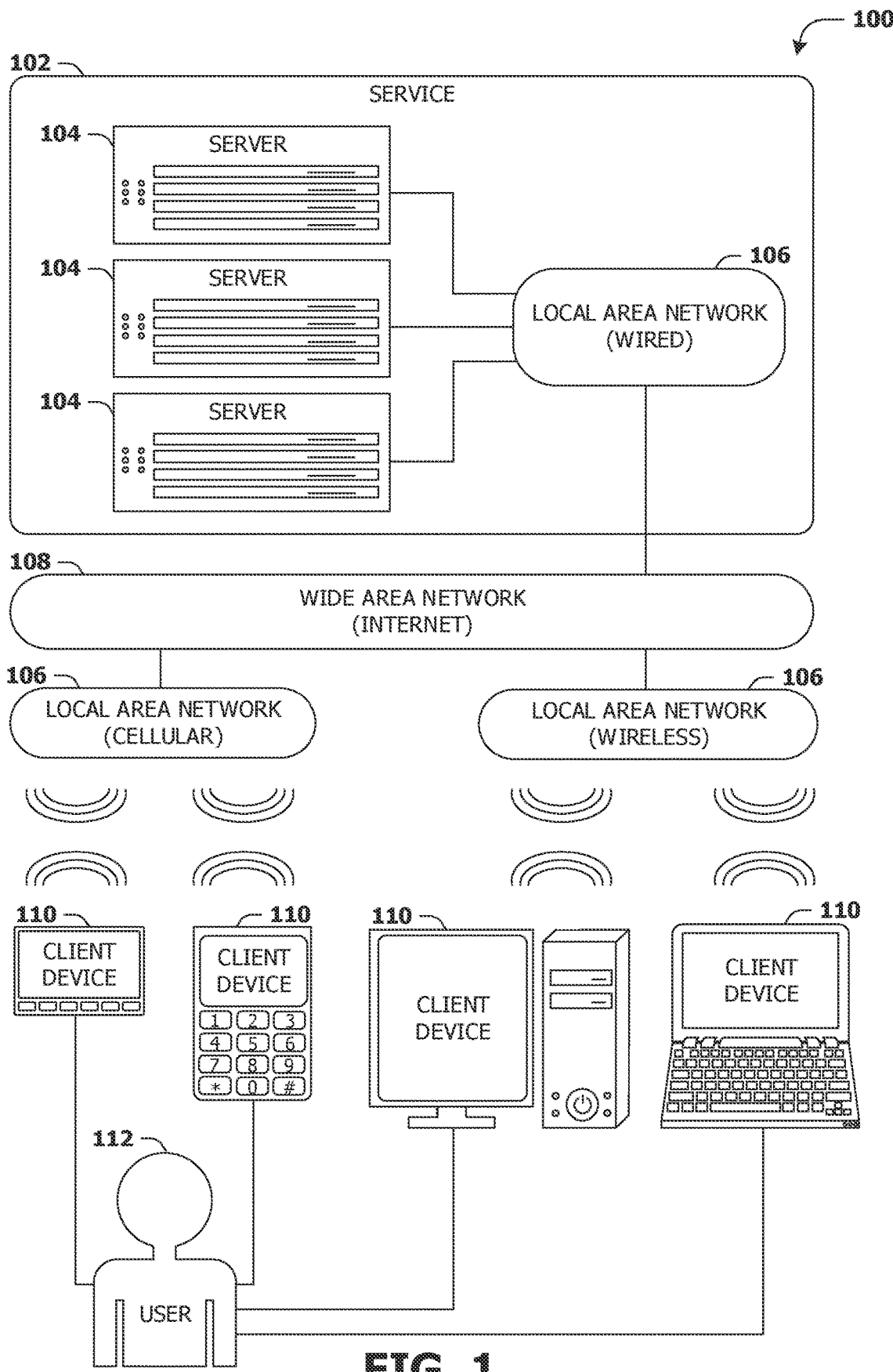
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 (and/or via a wired network) provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
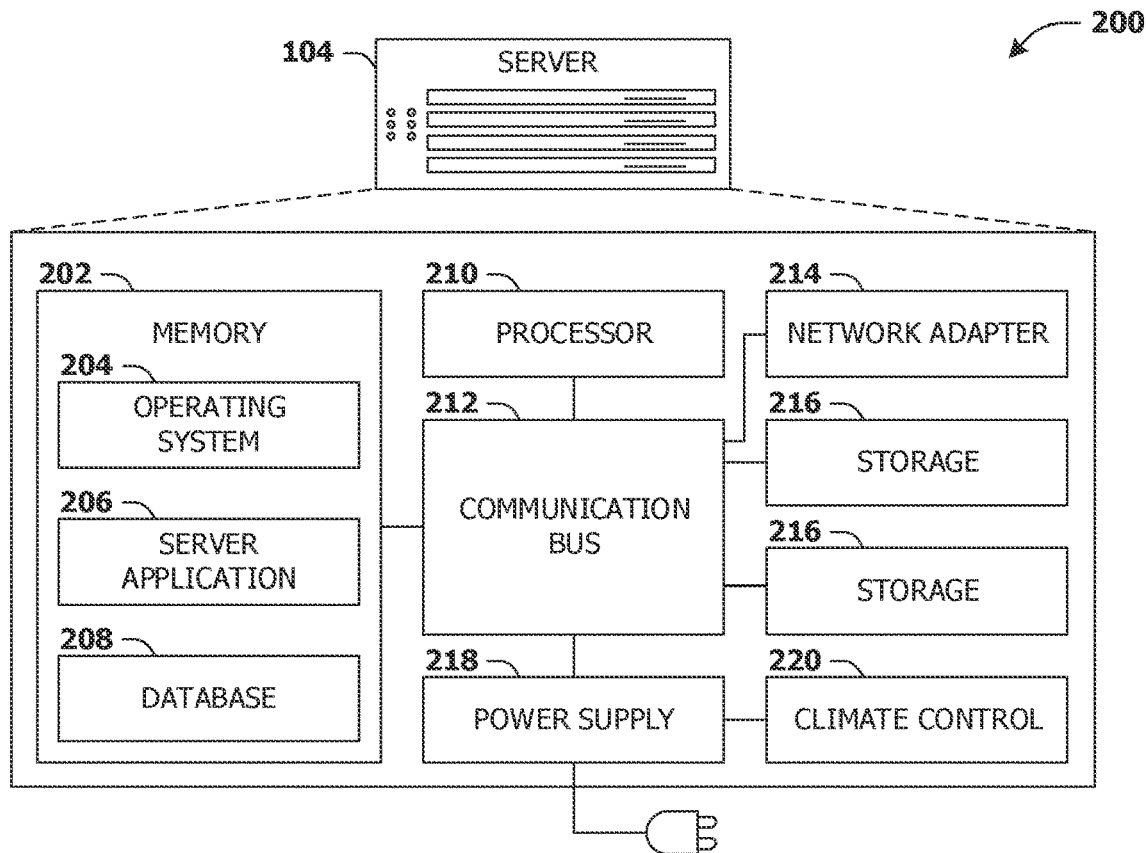
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
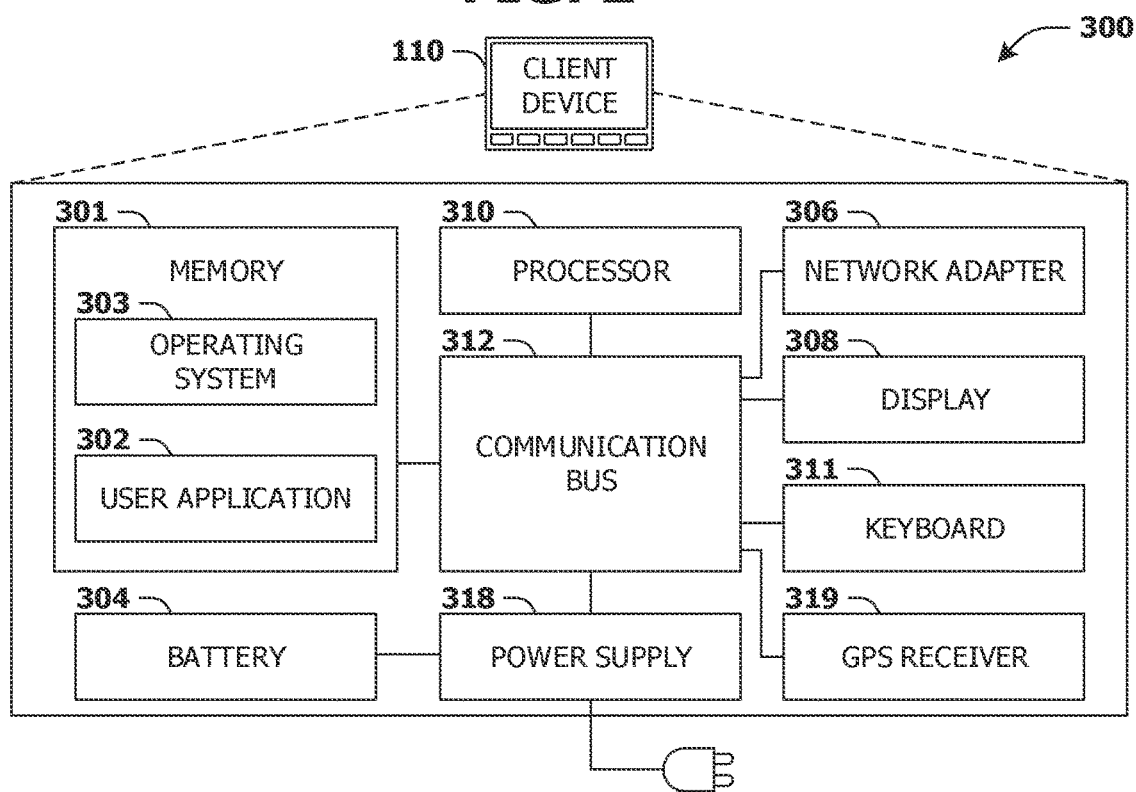
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for determining a performance metric score of a set of content item text and/or suggesting one or more sets of content item text based upon the set of content item text are provided. For example, a user (and/or a device associated with the user) may access and/or interact with a service, such as a browser, software, a website, an application, an operating system, etc. that provides a platform for uploading content item text and/or generating a content item based upon the content item text. In some examples, a content system may present the content item via one or more client devices. For example, the content item may be presented (as an advertisement, for example) via a client device in response to receiving a request for content (e.g., an advertisement request). However, the content item text uploaded by the user may be associated with a low performance metric score (e.g., a performance metric score lower than a threshold performance metric score) and/or the content item comprising the content item text may have poor performance, such as having less than a threshold amount of clicks during presentation of the content item via client devices, which may result in low revenue (e.g., less than a threshold amount of revenue) associated with clicks of the content item.

Thus, in accordance with one or more of the techniques presented herein, a content item text interface may be displayed via the device. A first set of content item text may be received via the content item text interface. A first performance metric score may be determined based upon the first set of content item text. The first performance metric score may comprise and/or may be based upon at least one of a conversion rate (e.g., a predicted conversion rate), a click-through-rate (CTR) (e.g., a predicted CTR), a cost per click (CPC) (e.g., a predicted CPC), a cost per acquisition (CPA) (e.g., a predicted CPA), a return on investment (ROI) (e.g., a predicted ROI), etc. associated with the first set of content item text. A plurality of similarity scores associated with a plurality of sets of content item text may be determined based upon the first set of content item text and the plurality of sets of content item text associated with a plurality of content items. The plurality of sets of content item text may comprise a second set of content item text of a first content item of the plurality of content items. A first similarity score of the plurality of similarity scores may be associated with a similarity between the first set of content item text and the second set of content item text. One or more sets of content item text may be selected from among the plurality of sets of content item text based upon the plurality of similarity scores and a plurality of performance metric scores associated with the plurality of sets of content item text. The plurality of performance metric scores may comprise one or more performance metric scores associated with the one or more sets of content item text. The one or more performance metric scores may be higher than the first performance metric score. A content item text suggestion interface comprising one or more representations of the one or more sets of content item text may be displayed via the device.

In some embodiments, by enabling the device to display the one or more representations of the one or more sets of content item text that have higher performance metric scores than the first performance metric score, the first set of content item text may be modified and/or improved based upon the one or more sets of content item text to generate a modified set of content item text, where a content item generated based upon the modified set of content item text may have improved performance as compared to a content item comprising the first set of content item text.

Figure 4:
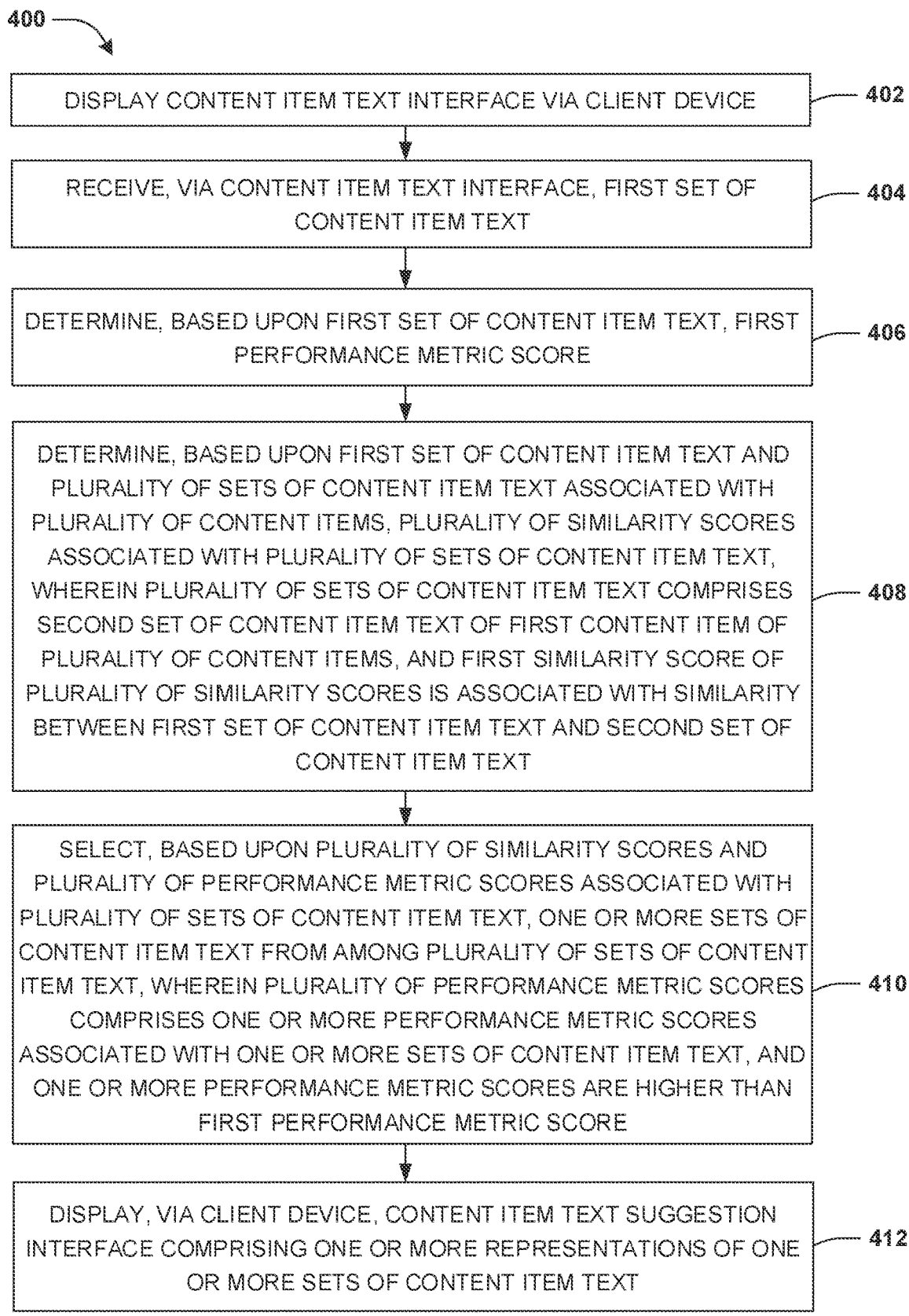
FIG. 4 is a flow chart illustrating an example method for determining a performance metric score of a set of content item text and/or suggesting one or more sets of content item text based upon the set of content item text.

An embodiment of determining a performance metric score of a set of content item text and/or suggesting one or more sets of content item text based upon the set of content item text is illustrated by an example method 400 of FIG. 4. A content system for generating content and/or presenting content via devices may be provided. In some examples, the content system may be an advertisement system (e.g., an online advertising system). Alternatively and/or additionally, the content system may not be an advertisement system. In some examples, the content system may provide content items (e.g., advertisements, images, links, videos, etc.) to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to consume and/or interact with the content item before the user can access content of a web page, utilize resources of an application and/or play a game.

At 402, a content item text interface may be displayed via a first client device. The content item text interface may be used by at least one of a user, an advertiser, a company, a brand, etc. to input content item text and/or generate a content item with the content item text. Other information (in addition to the content item text) may be input via the content item text interface, such as at least one of sizing information (e.g., a size and/or dimensions of the content item to be generated), one or more graphical objects (e.g., one or more images of the content item to be generated, such as a background image of the content item), an advertiser identifier (e.g., identification of the advertiser), a content item category (e.g., an advertisement category of the content item to be generated), etc. In an example, the content item may be generated based upon information input via the content item text interface, such as the content item text and/or the other information.

Figure 5A:
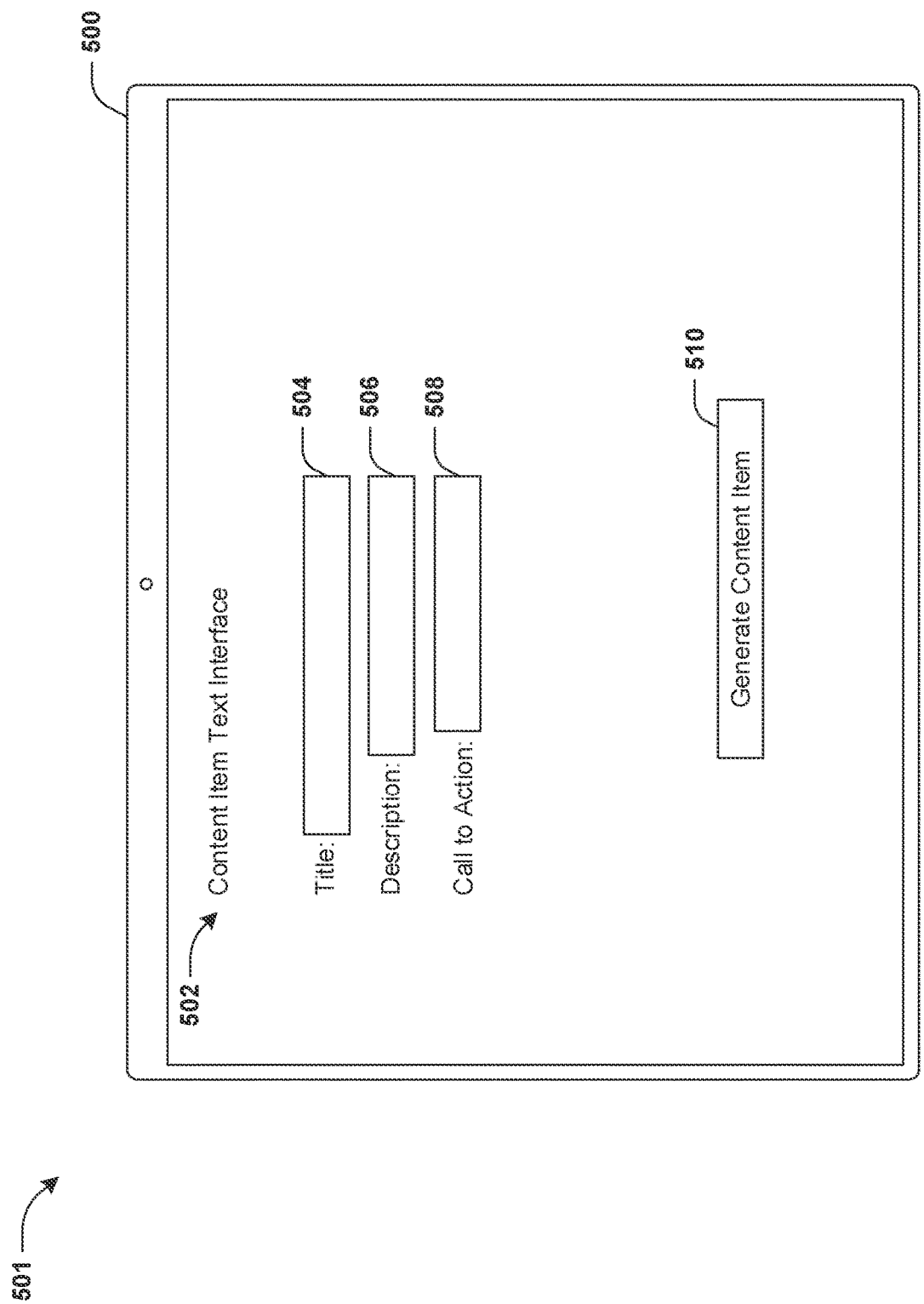
FIG. 5A is a component block diagram illustrating an example system for determining a performance metric score of a set of content item text and/or suggesting one or more sets of content item text based upon the set of content item text, where a content item text interface is displayed via a first client device.

FIGS. 5A-5M illustrate examples of a system 501 for determining a performance metric score of a set of content item text and/or suggesting one or more sets of content item text based upon the set of content item text, described with respect to the method 400 of FIG. 4. FIG. 5A illustrates the content item text interface (shown with reference number 502) being displayed via the first client device (shown with reference number 500). The content item text interface 502 may comprise one or more input text fields for inputting content item text. For example, the content item text interface 502 may comprise a title input field 504 for inputting text corresponding to a title (e.g., a title of a content item, such as an advertisement title), a description input field 506 for inputting text corresponding to a description (e.g., a description of a content item, such as an advertisement description), a call to action input field 506 for inputting text corresponding to a call to action, etc. In some examples, the content item text interface 502 may have auto-complete functionality such that in response to text being input to an input field of the one or more input text fields, one or more suggested text completion options may be displayed (e.g., a suggested text completion option may be accepted in response to a selection of the suggested text completion option). In some examples, the content item text interface 502 may comprise a selectable input 510 (e.g., a selectable button) associated with generating a content item. For example, in response to a selection of the selectable input 510, a content item may be generated based upon content item text (received via the content item text interface 502, for example), sizing information (received via the content item text interface 502, for example), one or more graphical objects (received via the content item text interface 502, for example), etc.

Figure 5B:
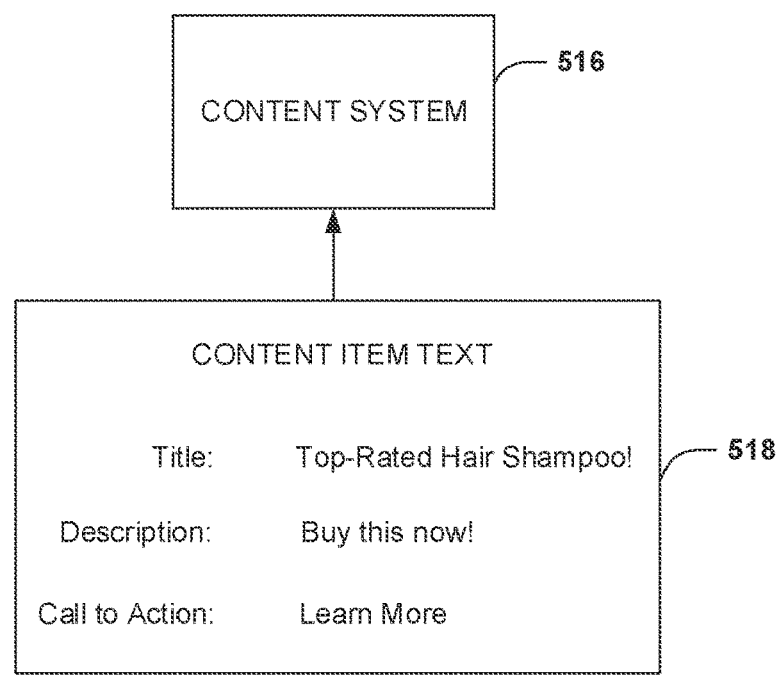
FIG. 5B is a component block diagram illustrating an example system for determining a performance metric score of a set of content item text and/or suggesting one or more sets of content item text based upon the set of content item text, where a first set of content item text is received by a content system.

At 404, a first set of content item text may be received via the content item text interface 502. FIG. 5B illustrates the first set of content item text (shown with reference number 518) being received by the content system (shown with reference number 516). In an example, the first set of content item text 518 may be input via the content item text interface 502 (e.g., via the one or more input text fields of the content item text interface 502). In an example, the first set of content item text 518 may comprise multiple parts, such as a title part (e.g., "Top-Rated Hair shampoo!"), a description part (e.g., "Buy this now!") and/or a call to action part (e.g., "Learn More"). The title part may be input via the title input field 504, the description part may be input via the description input field 506 and/or the call to action part may be input via the call to action input field 506.

At 406, a first performance metric score may be determined based upon the first set of content item text 518. The first performance metric score may correspond to a performance metric prediction associated with the first set of content item text 518, such as a predicted performance metric (e.g., at least one of a conversion rate, a click-through-rate (CTR), a cost per click (CPC), a cost per acquisition (CPA), a return on investment (ROI), etc.) of a content item comprising the first set of content item text 518. In an example, the first performance metric score may be a predicted conversion rate, a predicted CTR, a predicted CPC, a predicted CPA or a predicted ROI of a content item comprising the first set of content item text 518. Alternatively and/or additionally, the first performance metric score may be based upon the predicted conversion rate, the predicted CTR, the predicted CPC, the predicted CPA and/or the predicted ROI. For example, one or more operations (e.g., mathematical operations) may be performed using the predicted conversion rate, the predicted CTR, the predicted CPC, the predicted CPA and/or the predicted ROI to determine the first performance metric score (e.g., the predicted conversion rate, the predicted CTR, the predicted CPC, the predicted CPA and/or the predicted ROI may be at least one of summed, averaged, etc. to determine the first performance metric score).

Alternatively and/or additionally, the first performance metric score may be based upon a first entity (e.g., a first internet resource-side entity and/or a first publisher-side entity). The first entity may be associated with one or more internet resources, such as at least one of one or more web pages, one or more websites, one or more applications (e.g., a client application, a mobile application, a platform, etc.). The first entity may correspond to at least one of one or more internet resources, an internet resource identifier associated with one or more internet resources, a host device associated with one or more internet resources (e.g., the host device may comprise one or more computing devices, storage and/or a network configured to host the one or more internet resources), a host identifier of the host device, a domain (e.g., a domain name, a top-level domain, etc.) associated with one or more internet resources, an application identifier associated with an application, a publisher identifier associated with a publisher of one or more internet resources, etc. For example, an indication of the first entity may be received via the content item text interface. The first performance metric score may correspond to a predicted performance metric of a content item comprising the first set of content item text 518 being presented via one or more internet resources associated with the first entity. In an example where the first entity is a domain name (e.g., "www.stockmarketnews4u.com"), the one or more internet resources associated with the first entity may correspond to one or more web pages having the domain name.

Figure 5C:
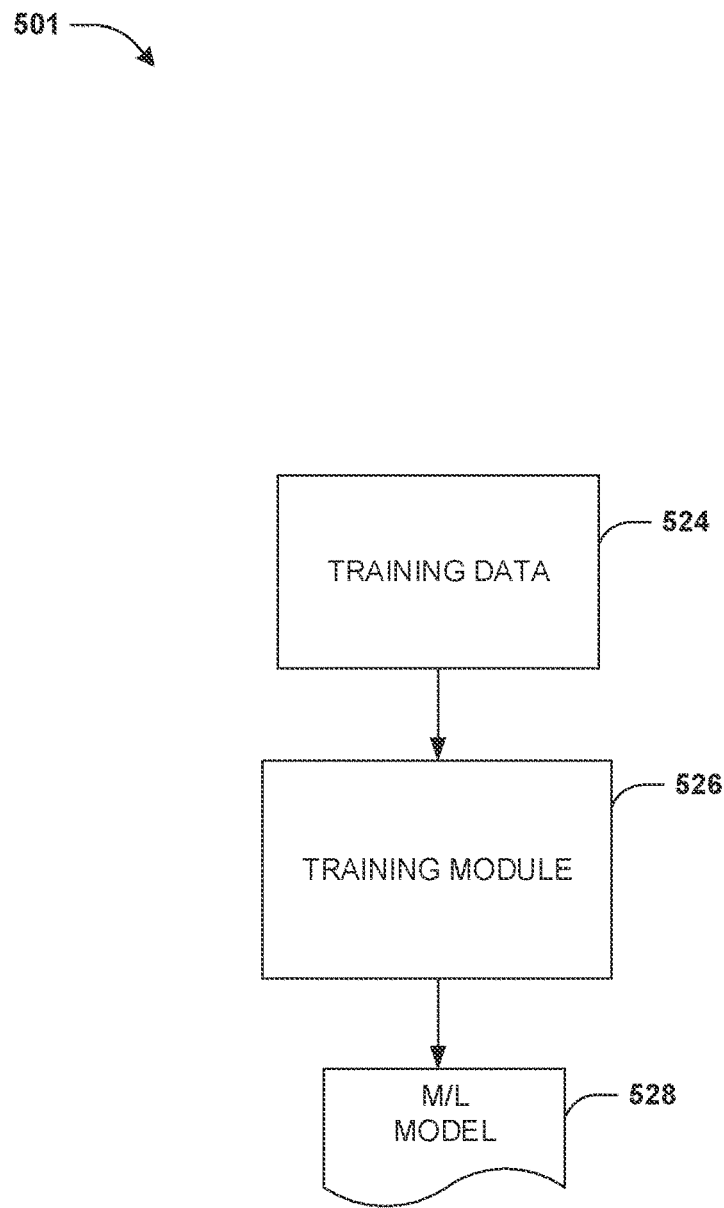
FIG. 5C is a component block diagram illustrating an example system for determining a performance metric score of a set of content item text and/or suggesting one or more sets of content item text based upon the set of content item text, where a training module trains a machine learning model to generate a first machine learning model.

In some examples, the first performance metric score is determined using a first machine learning model. FIG. 5C illustrates a training module 526 training a machine learning model to generate the first machine learning model (shown with reference number 528). In an example, first training data 524 may be input to the training module 526. The training module 526 may perform machine learning model training and/or generate the first machine learning model 528 using the first training data 524.

In some examples, the first training data 524 may be based upon a plurality of content events (e.g., historical events) associated with presentation of content items via client devices. In some examples, a content event of the plurality of content events (and/or each content event of the plurality of content events) may correspond to a presentation of a content item (e.g., presentation of an advertisement and/or an advertisement impression), and/or a selection of the content item (e.g., an advertisement click), where the content item may be provided by the content system.

In an example, the first training data 524 may comprise a plurality of sets of content item text associated with a plurality of content items. A set of content item text of the plurality of sets of content item text (and/or each set of content item text of the plurality of sets of content item text) may comprise text of a content item of the plurality of content items. For example, the plurality of sets of content item text may comprise a second set of content item text comprising text of a first content item of the plurality of content items, a third set of content item text comprising text of a second content item of the plurality of content items, etc.

Alternatively and/or additionally, the first training data 524 may comprise a plurality of sets of content event information associated with the plurality of content items. A set of content event information of the plurality of sets of content event information (and/or each set of content event information of the plurality of sets of content event information) may be based upon content events associated with a content item of the plurality of content items. For example, the plurality of sets of content event information may comprise a first set of content event information based upon content events associated with the first content item of the plurality of content items, a second set of content event information based upon content events associated with the second content item of the plurality of content items, etc.

In some examples, the first set of content event information may be indicative of at least one of a first quantity of content events associated with the first content item, a first quantity of click events associated with the first content item, a first quantity of conversion events associated with the first content item, a first performance metric associated with the first content item, etc. In an example, the first performance metric may be a conversion rate, a CTR, a CPC, a CPA or a ROI of the first content item. Alternatively and/or additionally, the first performance metric may be based upon the conversion rate, the CTR, the CPC, the CPA and/or the ROI of the first content item. A click event may correspond to a content event that comprises a selection of the first content item. In an example, a first content event associated with the first content item may comprise presentation of the first content item via a client device. The first content event may be a click event if a selection (e.g., a click) of the first content item is received via the client device during presentation of the first content item. A conversion event counted in the first quantity of conversion events may comprise an event in which a product and/or service associated with the first content item is purchased (by a user and/or a device) after the first content item is presented to the user and/or via the device (where the conversion event may be attributed to the presentation of the first content item to the user and/or via the device). In an example where the first performance metric comprises (and/or is based upon) a CTR associated with the first content item, the first performance metric may be determined based upon the first quantity of content events and the first quantity of click events. For example, one or more operations (e.g., mathematical operations) may be performed using the first quantity of content events and the first quantity of click events to determine the CTR (e.g., the CTR may be equal to the first quantity of click events divided by the first quantity of content events). In an example where the first performance metric comprises (and/ or is based upon) a conversion rate associated with the first content item, the first performance metric may be determined based upon the first quantity of content events and/or the first quantity of conversion events. For example, one or more operations (e.g., mathematical operations) may be performed using the first quantity of content events and the first quantity of conversion events to determine the conversion rate (e.g., the conversion rate may be equal to the first quantity of click events divided by the first quantity of content events).

Alternatively and/or additionally, the first set of content event information may comprise one or more sets of entity-based content event information associated with the first content item and one or more entities. A set of entity-based content event information of the one or more sets of entity-based content event information (and/or each set of entity-based content event information of the one or more sets of entity-based content event information) may be based upon content events associated with the first content item and the entity. In an example, the one or more entities may comprise the first entity. For example, the one or more sets of entity-based content event information may comprise a first set of entity-based content event information associated with the first content item and the first entity. The first set of entity-based content event information may be indicative of at least one of a second quantity of content events associated with the first content item and the first entity, a second quantity of click events associated with the first content item and the first entity, a second quantity of conversion events associated with the first content item and the first entity, a second performance metric associated with the first content item and the first entity, etc. In an example, the second performance metric may be a conversion rate, a CTR, a CPC, a CPA or a ROI associated with the first content item and the first entity. Alternatively and/or additionally, the second performance metric may be based upon the conversion rate, the CTR, the CPC, the CPA and/or the ROI associated with the first content item and the first entity. The second quantity of content events, the second quantity of click events and/or the second performance metric may be determined based upon content events, click events and/or conversion events that occur in association with the first content item and the first entity. For example, the second quantity of content events may correspond to a quantity of content events in which the first content item is presented via a client device on an internet resource associated with the first entity. Alternatively and/or additionally, the second quantity of click events may correspond to a quantity of click events in which the first content item is presented and selected (e.g., clicked) via a client device on an internet resource associated with the first entity. Alternatively and/or additionally, the second quantity of conversion events may correspond to a quantity of conversion events that are attributed to content events associated with first content item and the first entity.

Alternatively and/or additionally, the first training data 524 may comprise a plurality of sets of identification information associated with the plurality of content items. A set of identification information of the plurality of sets of identification information (and/or each set of identification information of the plurality of sets of identification information) may be indicative of at least one of a content item identifier of a content item of the plurality of content items, a content item category of the content item, an advertiser identifier of an advertiser of the content item, a campaign identifier of an advertisement campaign of the content item, a group identifier of a group of content items comprising the content item, etc. In an example, the plurality of sets of identification information may comprise a first set of identification information associated with the first content item of the plurality of content items, a second set of identification information associated with the second content item of the plurality of content items, etc.

The first machine learning model 528 may be trained and/or configured to determine a performance metric score based upon content item text, such as a set of content item text input via the content item text interface 502. In some examples, the first machine learning model 528 may comprise at least one of a neural network, a tree-based model, a machine learning model used to perform linear regression, a machine learning model used to perform logistic regression, a decision tree model, a support vector machine (SVM), a Bayesian network model, a k-Nearest Neighbors (k-NN) model, a K-Means model, a random forest model, a machine learning model used to perform dimensional reduction, a machine learning model used to perform gradient boosting, etc. In an example, the first machine learning model 528 may comprise a linear model, a logistic regression model, a naïve Bayes logistic regression (NBLR) model and/or a deep learning model. Alternatively and/or additionally, the first machine learning model 528 may comprise a Bidirectional Encoder Representations from Transformers (BERT) model, such as a model (e.g., a deep learning model) with a BERT architecture.

Figure 5D:
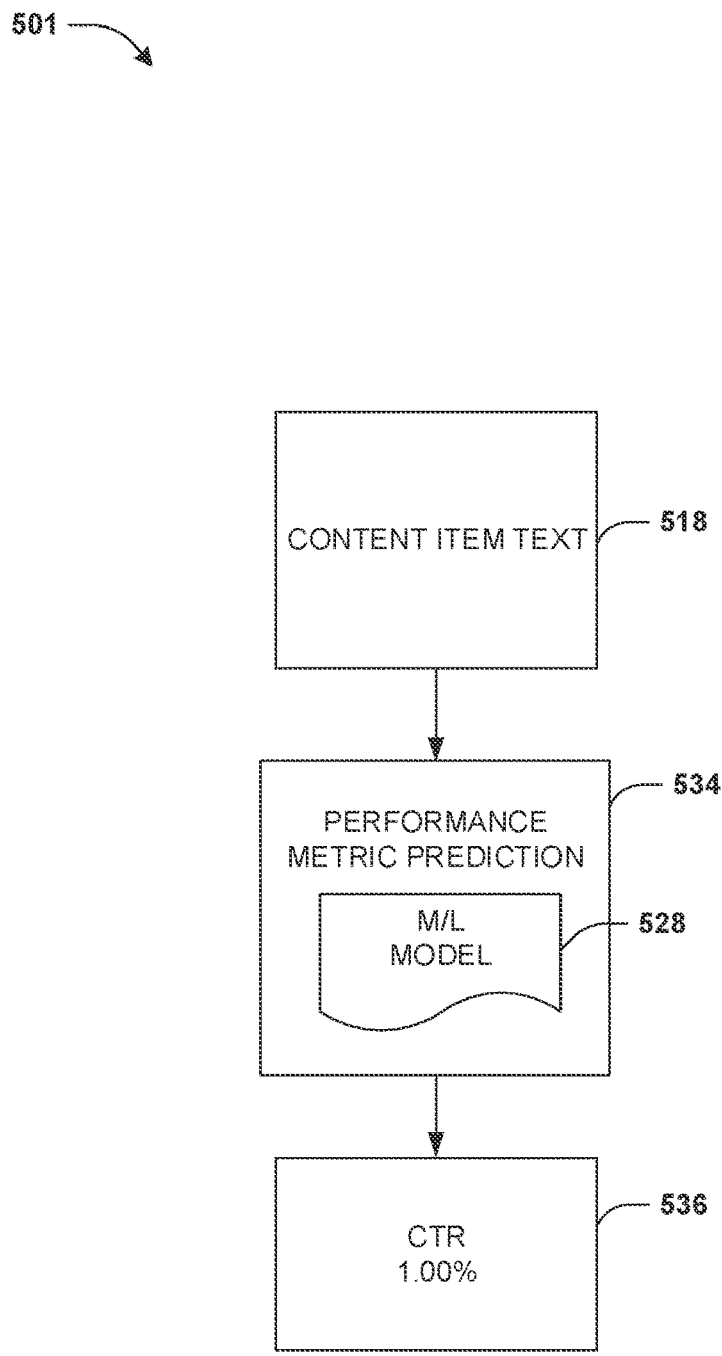
FIG. 5D is a component block diagram illustrating an example system for determining a performance metric score of a set of content item text and/or suggesting one or more sets of content item text based upon the set of content item text, where a first performance metric score is determined using a first machine learning model.

FIG. 5D illustrates the first performance metric score (shown with reference number 536) being determined using the first machine learning model 528. In an example, the first machine learning model 528 may be loaded into a performance metric prediction module 534. The first set of content item text 518 may be input to the performance metric prediction module 534. The performance metric prediction module 534 may use the first machine learning model 528 to perform one or more actions, such as at least one of one or more classification actions, one or more regression actions, one or more clustering actions, etc. For example, the performance metric prediction module 534 may use the first machine learning model 528 to output information based upon one or more inputs and/or use the information to provide one or more services. For example, the performance metric prediction module 534 may use the first machine learning model 528 to determine the first performance metric score 536 based upon the first set of content item text 518. In an example shown in FIG. 5D, the performance metric prediction module 534 may output the first performance metric score 536 as 1.00%. For example, the first performance metric score 536 may comprise a predicted CTR of 1.00%. In some examples, the first performance metric score 536 may be determined based upon the first entity (based upon receiving an indication of the first entity from the first client device 500, for example). For example, an indication of the first entity may be input to the performance metric prediction module 534, wherein the performance metric prediction module 534 and/or the first machine learning model 528 may determine the first performance metric score 536 based upon the first entity and/or the first set of content item text 518 (e.g., the first performance metric score 536 may correspond to a predicted performance metric of a content item comprising the first set of content item text 518 being presented via one or more internet resources of the first entity).

In some examples, a model may be selected for use in determining the first performance metric sore 536 based upon targeting information and/or a content format associated with the first set of content item text 518. In an example, the targeting information and/or the content format may be input via the content item text interface 502. The targeting information may comprise at least one of a target audience of a content item comprising the first set of content item text 518, a target internet resource of a content item comprising the first set of content item text 518, an interest group of a content item comprising the first set of content item text 518, a location of users to which a content item comprising the first set of content item text 518 may be presented, etc. The content format may comprise a format of a content item to be generated based upon content item text (e.g., content item text input via the content item text interface 502, such as the first set of content item text 518). For example, the content format may be indicative of sizing information, content item type information (e.g., banner advertisement, mobile advertisement, video advertisement, etc.). In some examples, in response to selecting the model, the model may be used to determine the first performance metric score 536.

At 408, a plurality of similarity scores associated with a second plurality of sets of content item text may be determined based upon the first set of content item text 518 and/or the second plurality of sets of content item text, wherein the second plurality of sets of content item text is associated with a second plurality of content items. A set of content item text of the second plurality of sets of content item text (and/or each set of content item text of the second plurality of sets of content item text) may comprise text of a content item of the second plurality of content items. For example, the second plurality of sets of content item text may comprise a fourth set of content item text comprising text of a third content item of the second plurality of content items, a fifth set of content item text comprising text of a fourth content item of the second plurality of content items, etc. In some examples, the second plurality of sets of content item text may be the same as the plurality of sets of content item text. Alternatively and/or additionally, the second plurality of sets of content item text may be different than the plurality of sets of content item text. Alternatively and/or additionally, the second plurality of sets of content item text may comprise one, some and/or all of the plurality of sets of content item text. Alternatively and/or additionally, the second plurality of sets of content item text may not comprise any of the plurality of sets of content item text.

Figure 5E:
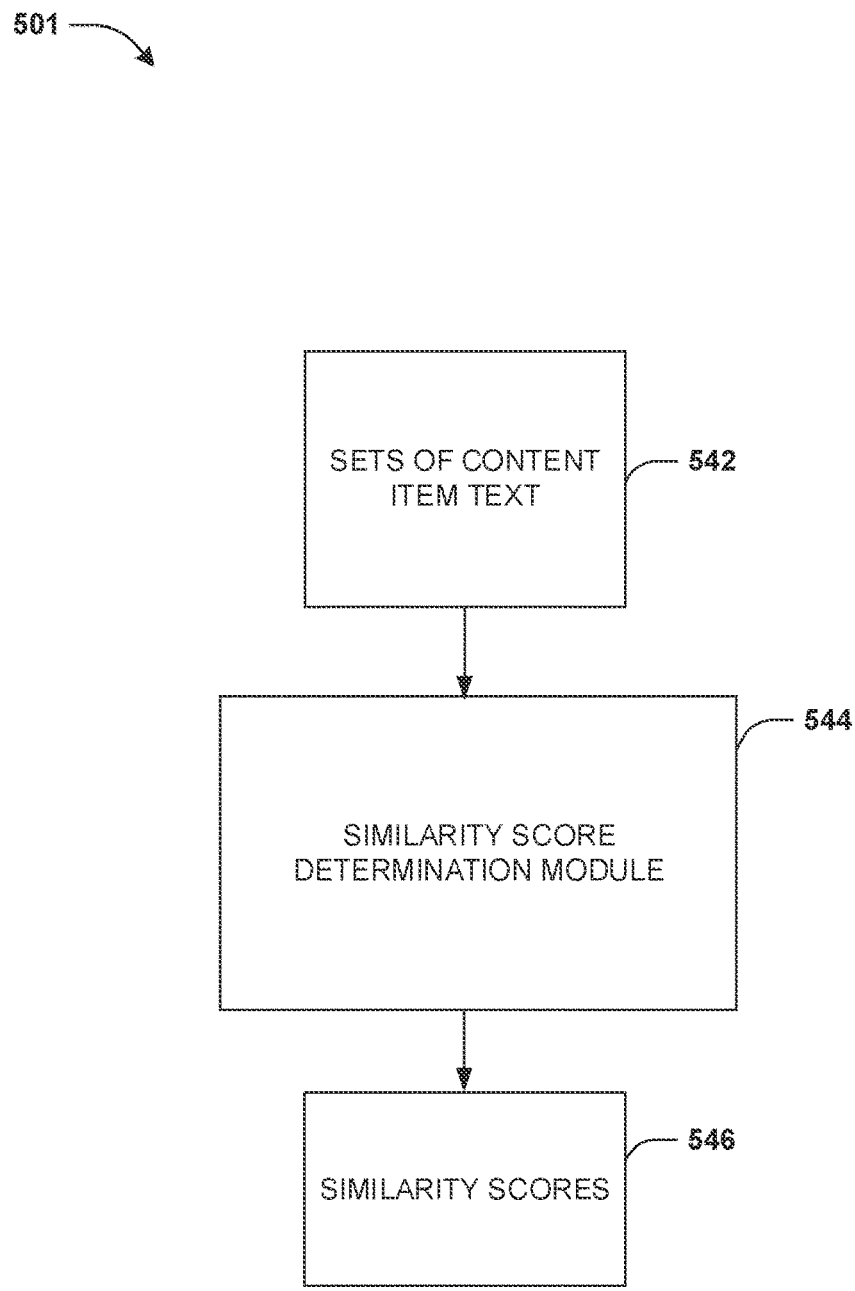
FIG. 5E is a component block diagram illustrating an example system for determining a performance metric score of a set of content item text and/or suggesting one or more sets of content item text based upon the set of content item text, where a plurality of similarity scores are determined.

FIG. 5E illustrates determination of the plurality of similarity scores (shown with reference number 546). Information 542 may be input to a similarity score determination module 544. The similarity score determination module 544 may determine the plurality of similarity scores 546 based upon the information 542. The information 542 may comprise the first set of content item text 518 and/or the second plurality of sets of content item text associated with the second plurality of content items.

In some examples, a similarity score of the plurality of similarity scores 546 (and/or each similarity score of the plurality of similarity scores 546) may be associated with a similarity (e.g., a contextual similarity) between the first set of content item text 518 and a set of content item text of the second plurality of sets of content item text. In an example, the plurality of similarity scores 546 comprises a first similarity score associated with a first similarity between the first set of content item text 518 and the fourth set of content item text, a second similarity score associated with a second similarity between the first set of content item text 518 and the fifth set of content item text, etc.

In some examples, the plurality of similarity scores 546 may be determined by comparing the first set of content item text 518 with sets of content item text of the second plurality of sets of content item text. For example, the first similarity score may be determined by comparing the first set of content item text 518 with the fourth set of content item text to identify one or more first words and/or one or more first characters in the first set of content item text 518 that match and/or are similar to one or more second words and/or one or more second characters in the fourth set of content item text. The first similarity score may be determined based upon the one or more first words, the one or more first characters, the one or more second words and/or the one or more second characters (such as based upon an amount of the one or more first words, the one or more first characters, the one or more second words and/or the one or more second characters, wherein an increase in the amount corresponds to an increase in the first similarity score, for example). In an example, a first word of the first set of content item text 518 may be determined to match a second word of the fourth set of content item text if the first word is the same as the second word, and/or if the first word comprises one or more letters that are the same as one or more letters of the second word (e.g., the first word may comprise "apple" and the second word may comprise "apples"). Alternatively and/or additionally, a third word of the first set of content item text 518 may be determined to be similar to a fourth word of the fourth set of content item text if the third word has a similar meaning as the fourth word, is a synonym of the fourth word, and/or is used in a similar context as the fourth word (e.g., the fourth word may comprise "buy" and the fourth word may comprise "purchase").

Alternatively and/or additionally, the plurality of similarity scores 546 may be determined based upon a content item category (e.g., political advertisement category, car advertisement category, current events category, cooking category, etc.) associated with the first set of content item text 518. For example, the content item category may be determined based upon information indicative of the content item category received via the content item text interface 502. Alternatively and/or additionally, the content item category may be determined by analyzing the first set of content item text 518 (and/or one or more other sets of content item text) to determine the content item category. In an example, the first similarity score may be determined based upon the content item category associated with the first set of content item text 518 and/or a second content item category associated with the fourth set of content item text (e.g., the second content item category may correspond to a content item category of the third content item comprising the fourth set of content item text). In an example, the first similarity score may be higher if the content item category matches the second content item category (such as if both the content item category and the second content item category correspond to political advertisements) than if the content item category does not match the second content item category.

Alternatively and/or additionally, the plurality of similarity scores 546 may be determined based upon a first topic associated with the first set of content item text 518. For example, the first topic may be determined by analyzing the first set of content item text 518 (and/or one or more other sets of content item text), such as using one or more natural language processing (NLP) techniques, to determine the topic. In an example, the first similarity score may be determined based upon the topic associated with the first set of content item text 518 and/or a second topic associated with the fourth set of content item text (e.g., the second content item category may correspond to a topic of the third content item comprising the fourth set of content item text). In an example, the first similarity score may be higher if the topic matches the second topic (such as if both the topic and the second topic correspond to politics) than if the topic does not match the second topic.

In some examples, the plurality of similarity scores 546 may be determined by generating representations of sets of content item text and/or determining similarity scores based upon the representations. In an example, a first representation of the first set of content item text 518 may be determined. In some examples, the first representation may be an embedding-based representation. The first representation may be determined based upon a first set of representations. The first set of representations may comprise at least one of representations of tokens of the first set of content item text 518 (e.g., representations of all tokens of the first set of content item text 518), representations of phrases of the first set of content item text 518 (e.g., representations of all phrases of the first set of content item text 518), representations of words of the first set of content item text 518 (e.g., representations of all words of the first set of content item text 518), representations of characters of the first set of content item text 518 (e.g., representations of all characters of the first set of content item text 518), etc. A representation of the first set of representations may comprise an embedding (e.g., a vector representation) of at least one of a token, a phrase, a word, a character, etc. of the first set of content item text 518. In an example, a representation of the first set of representations may be determined using at least one of word2vec, fastText, sentence-BERT, etc. In some examples, one or more operations (e.g., mathematical operations) may be performed using the first set of representations to determine the first representation of the first set of content item text 518. In an example, representations of the first set of representations may be averaged to determine the first representation (e.g., the first representation may correspond to an average of the first set of representations).

In some examples, a plurality of representations (e.g., embedding-based representations) associated with the second plurality of sets of content item text may be determined. A representation of the plurality of representations (and/or each representation of the plurality of representations) may correspond to a representation (e.g., an embedding-based representation) of a set of content item text of the second plurality of sets of content item text. For example, the plurality of representations may comprise a second representation (e.g., embedding-based representation) of the fourth set of content item text of the second plurality of sets of content item text, a third representation (e.g., embedding-based representation) of the fifth set of content item text of the second plurality of sets of content item text, etc. In some examples, representations of the plurality of representations may be determined using one or more of the techniques provided herein with respect to determining the first representation of the first set of content item text 518.

In some examples, the plurality of similarity scores 546 may be determined based upon the first representation of the first set of content item text 518 and the plurality of representations associated with the second plurality of sets of content item text. In an example, the first similarity score associated with the first similarity between the first set of content item text 518 and the fourth set of content item text may be determined based upon the first representation and the second representation of the fourth set of content item text. For example, one or more operations (e.g., mathematical operations) may be performed using the first representation and the second representation to determine the first similarity score. In an example, the first similarity score may be based upon (and/or may be equal to) a measure of similarity between the first representation and the second representation, such as a cosine similarity between the first representation and the second representation. In some examples, other similarity scores (other than the first similarity score) of the plurality of similarity scores 546 may be determined using one or more of the techniques provided herein with respect to determining the first similarity score.

At 410, one or more first sets of content item text may be selected from among the second plurality of sets of content item text based upon the plurality of similarity scores and/or a plurality of performance metric scores associated with the second plurality of sets of content item text. In some examples, the one or more first sets of content item text may be selected for presentation (e.g., suggestion) via the content item text interface and/or the first client device 500. In some examples, the one or more first sets of content item text may be associated with one or more first performance metric scores (of the plurality of performance metric scores) that are higher than the first performance metric score associated with the first set of content item text 518. In some examples, a performance metric score of the plurality of performance metric scores (and/or each performance metric score of the plurality of performance metric scores) comprises a performance metric of a content item comprising a set of content item text of the second plurality of sets of content item text, wherein the performance metric is a conversion rate, a CTR, a CPC, a CPA and/or a ROI of the content item (and/or wherein the performance metric is based upon the conversion rate, the CTR, the CPC, the CPA and/or the ROI of the content item). In some examples, a performance metric score of the plurality of performance metric scores (and/or each performance metric score of the plurality of performance metric scores) may be determined using one or more of the techniques provided herein with respect to determining the first performance metric and/or the second performance metric associated with the first content item. In some examples, a performance metric score of the plurality of performance metric scores (and/or each performance metric score of the plurality of performance metric scores) may be based upon content events, click events and/or conversion events associated with a content item comprising a set of content item text of the second plurality of sets of content item text (such as described with respect to determining the first performance metric). In some examples, a performance metric score of the plurality of performance metric scores (and/or each performance metric score of the plurality of performance metric scores) may be based upon content events, click events and/or conversion events associated with the first entity and a content item comprising a set of content item text of the second plurality of sets of content item text (such as described with respect to determining the second performance metric).

In some examples, a third plurality of sets of content item text may be selected from among the second plurality of sets of content item text based upon the plurality of similarity scores. In some examples, the third plurality of sets of content item text may comprise sets of content item text that are determined to be similar (e.g., contextually similar) to the first set of content item text 518 (and/or the plurality of sets of content item text may comprise sets of content item text, from among the second plurality of sets of content item text, that are determined to be most similar to the first set of content item text 518). In some examples, the third plurality of sets of content item text may be selected from among the second plurality of sets of content item text based upon a determination that the third plurality of sets of content item text are associated with highest similarity scores of the plurality of similarity scores. In an example, the third plurality of sets of content item text may be selected from among the second plurality of sets of content item text based upon a determination that the third plurality of sets of content item text are associated with n highest similarity scores of the plurality of similarity scores (e.g., sets of content item text associated with the n highest similarity scores of the plurality of similarity scores may be included in the third plurality of sets of content item text). In an example where n is 10, 10 sets of content item text associated with the 10 highest similarity scores of the plurality of similarity scores may be selected and/or included in the third plurality of sets of content item text. Alternatively and/or additionally, the second plurality of sets of content item text may be ranked based upon the plurality of similarity scores (e.g., a set of content item text having a higher similarity score is ranked higher than a set of content item text having a lower similarity score), and/or the top n ranked sets of content item text may be selected from among the second plurality of sets of content item text (e.g., the top n ranked sets of content item text may be included in the third plurality of sets of content item text). Alternatively and/or additionally, the third plurality of sets of content item text may be selected from among the second plurality of sets of content item text based upon a determination that the third plurality of sets of content item text are associated with similarity scores (of the plurality of similarity scores) that exceed a threshold similarity score.

In some examples, the third plurality of sets of content item text may be selected from among the second plurality of sets of content item text using one or more techniques to perform a nearest neighbor search (NNS) based upon the first representation and the plurality of representations. In some examples, the NNS may be performed using one or more k-NN techniques and/or one or more approximate nearest neighbors techniques. In an example, the one or more k-NN techniques and/or the one or more approximate nearest neighbors techniques may be used to determine the plurality of similarity scores and/or to select the third plurality of sets of content item text from the second plurality of sets of content item text based upon at least one of the plurality of similarity scores, the first set of content item text 518, the second plurality of sets of content item text, the first representation of the first set of content item text 518, the plurality of representations associated with the second plurality of sets of content item text, etc.

In some examples, the one or more first sets of content item text may be selected from among the third plurality of sets of content item text based upon a determination that each performance metric score of the one or more first performance metric scores meets (e.g., is equal to and/or exceeds) a threshold performance metric score. The threshold performance metric score may be based upon the first performance metric score. For example, the threshold performance metric score may be equal to the first performance metric score. Alternatively and/or additionally, the threshold performance metric score may be higher than the first performance metric score. In an example, the threshold performance metric score may be determined based upon the first performance metric score and a value. For example, one or more operations (e.g., mathematical operations) may be performed using the first performance metric score and the value to determine the threshold performance metric score. In an example, the threshold performance metric score may be equal to the first performance metric score times the value (e.g., in an example in which the first performance metric score is 1.00% and the value is 1.3, the threshold performance metric score may be 1.30%). Alternatively and/or additionally, the threshold performance metric score may be equal to the first performance metric score plus the value (e.g., in an example in which the first performance metric score is 1.00% and the value is 0.5%, the threshold performance metric score may be 1.50%). In some examples, the threshold performance metric score and/or the value may be determined based upon the content item category associated with the first set of content item text 518.

Alternatively and/or additionally, the one or more first sets of content item text may be selected from among the third plurality of sets of content item text based upon a determination that the one or more first sets of content item text are associated with highest performance metric scores of a second plurality of performance metric scores associated with the third plurality of sets of content item text. The plurality of performance metric scores associated with the second plurality of sets of content item text may comprise the second plurality of performance metric scores associated with the third plurality of sets of content item text. In an example, the one or more first sets of content item text may be selected from among the third plurality of sets of content item text based upon a determination that the one or more first sets of content item text are associated with m highest performance metric scores of the second plurality of performance metric scores associated with the third plurality of sets of content item text (e.g., one or more sets of content item text associated with the m highest performance metric scores of the second plurality of performance metric scores may be included in the one or more first sets of content item text). Alternatively and/or additionally, the third plurality of sets of content item text may be ranked based upon the second plurality of performance metric scores associated with the third plurality of sets of content item text (e.g., a set of content item text having a higher performance metric score is ranked higher than a set of content item text having a lower performance metric score), and/or the top m ranked sets of content item text may be selected from among the third plurality of sets of content item text. In an example in which a set of content item of the top m ranked sets of content item text is associated with a performance metric score that is less than the threshold performance metric score, the set of content item may not be included in the one or more first sets of content item text (e.g., the one or more first sets of content item text may comprise less than m sets of content item text).

In some examples, the plurality of performance metric scores associated with the second plurality of sets of content item text may be determined based upon content event information associated with content items of the second plurality of sets of content item text. In an example, the plurality of performance metric scores may comprise a second performance metric score associated with the fourth set of content item text of the second plurality of sets of content item text. The second performance metric score may be determined based upon a third set of content event information associated with the third content item (comprising the fourth set of content item text). The third set of content event information may be based upon content events associated with the third content item of the plurality of content items. Alternatively and/or additionally, the third set of content event information may be a set of entity-based content event information associated with the third content item (based upon content events associated with the third content item and the first entity, for example). In an example, the third set of content event information may comprise at least one of a quantity of content events associated with the third content item, a quantity of click events associated with the third content item, a performance metric associated with the third content item, etc., where the performance metric may be determined based upon the quantity of click events and/or the quantity of content events, for example. In an example, the second performance metric score may be based upon (e.g., equal to) the performance metric associated with the third content item.

Figure 5F:
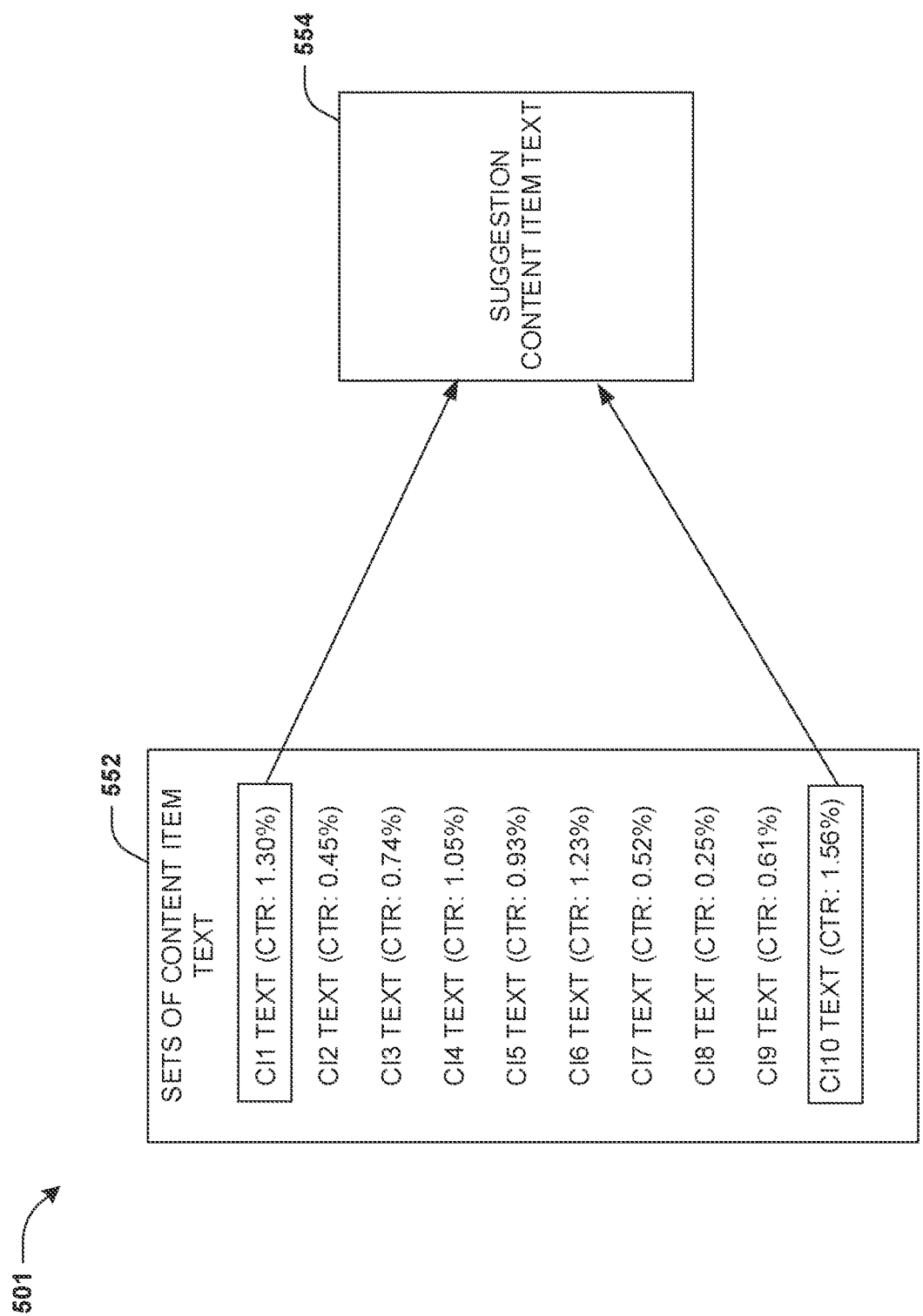
FIG. 5F is a component block diagram illustrating an example system for determining a performance metric score of a set of content item text and/or suggesting one or more sets of content item text based upon the set of content item text, where one or more first sets of content item text are selected from a third plurality of sets of content item text.

FIG. 5F illustrates selection of the one or more first sets of content item text (shown with reference number 554) from the third plurality of sets of content item text (shown with reference number 552). For example, the one or more first sets of content item text 554 may be selected from the third plurality of sets of content item text 552 based upon a determination that performance metric scores (e.g., performance metrics determined based upon content events) associated with the one or more first sets of content item text 554 meet the threshold performance metric score (e.g., 1.30%).

At 412, a content item text suggestion interface comprising one or more representations of the one or more first sets of content item text 554 may be displayed via the content item text interface and/or the first client device 500. In some examples, the content item text suggestion interface comprising the one or more representations may be displayed in response to a determination that each performance metric score of the one or more first performance metric scores meets the threshold performance metric score.

In some examples, a first text strength classification of the first set of content item text 518 may be determined based upon the first performance metric score and/or the one or more first performance metric scores associated with the one or more first sets of content item text 554. In an example, the first text strength classification may be a binary classification. Alternatively and/or additionally, the first text strength classification may be a non-binary classification. The first text strength classification may be indicative of a relative strength and/or relative performance metric of the first set of content item text 518 (relative to the one or more first performance metric scores, for example). In some examples, the first text strength classification may correspond to a first classification if the one or more first performance metric scores associated with the one or more first sets of content item text 554 meet the threshold performance metric score (e.g., the first text strength classification may be determined to be the first classification based upon a determination that the one or more first performance metric scores meet the threshold performance metric score). Alternatively and/or additionally, the first text strength classification may correspond to a second classification if the third plurality of sets of content item text 552 does not comprise a set of content item text having a performance metric score (of the plurality of performance metric scores) that meets the threshold performance metric score, such as if each set of content item text of the third plurality of sets of content item text 552 is associated with a performance metric score that does not meet the threshold performance metric score (e.g., the first text strength classification may be determined to be the second classification based upon a determination that the third plurality of sets of content item text 552 does not comprise a set of content item text having a performance metric score that meets the threshold performance metric score).

Alternatively and/or additionally, the first text strength classification may be a level-based classification based upon the first performance metric score and/or the one or more first performance metric scores. In an example, the first text strength classification may be based upon a value, where the value is determined based upon the first performance metric score and/or the one or more first performance metric scores. In some examples, the value may correspond to a difference between the first performance metric score and a performance metric score (such as a highest performance metric score) of the one or more first performance metric scores. In an example, if the value is within a first range (and/or if the value is lower than a first threshold value and/or higher than a second threshold value), the first text strength classification may correspond to the first classification (e.g., low). Alternatively and/or additionally, if the value is within a second range (and/or if the value is lower than a third threshold value and/or higher than a fourth threshold value), the first text strength classification may correspond to a third classification (e.g., very low).

Figure 5G:
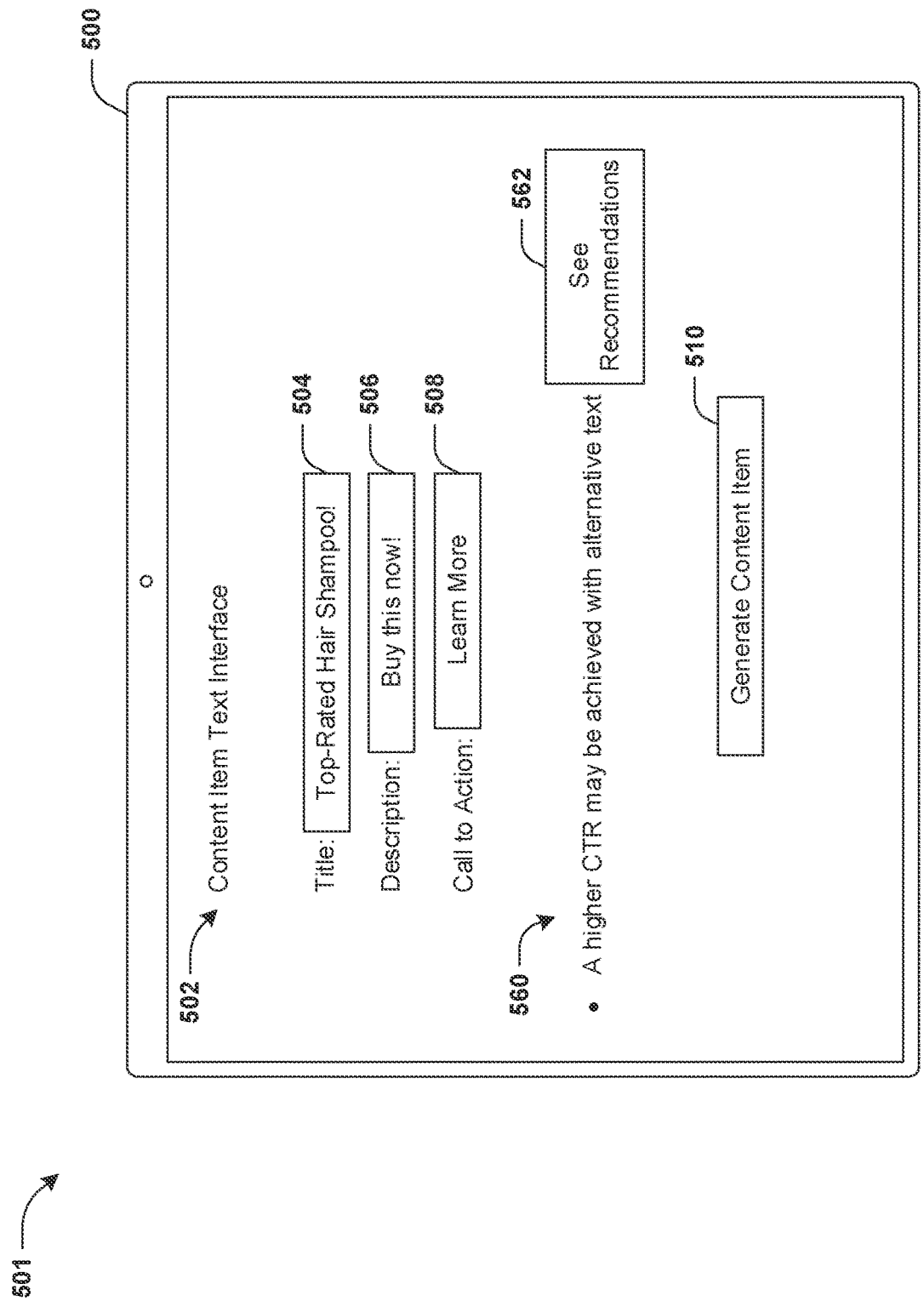
FIG. 5G is a component block diagram illustrating an example system for determining a performance metric score of a set of content item text and/or suggesting one or more sets of content item text based upon the set of content item text, where a first indication of a first text strength classification is displayed via a content item text interface.
Figure 5H:
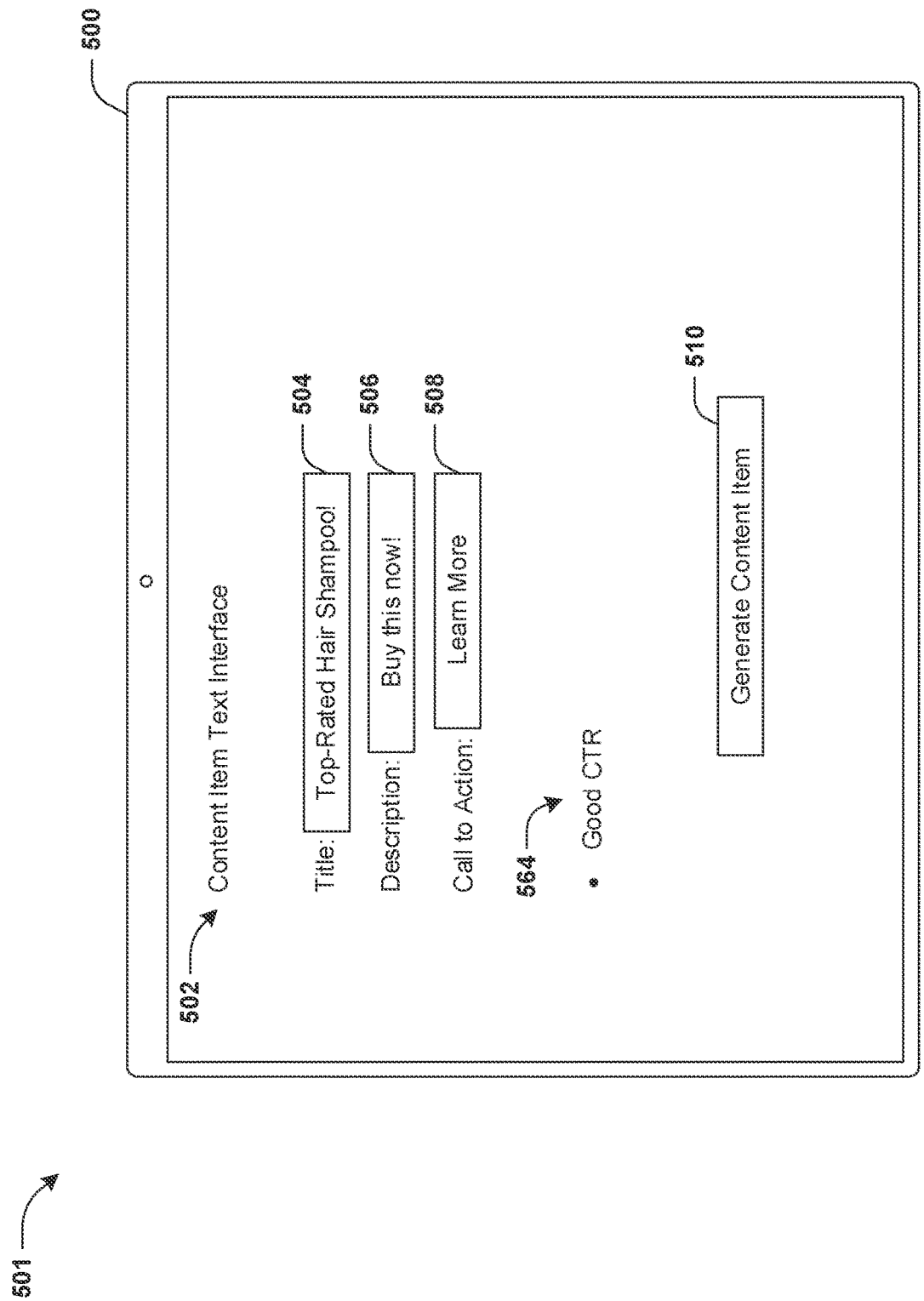
FIG. 5H is a component block diagram illustrating an example system for determining a performance metric score of a set of content item text and/or suggesting one or more sets of content item text based upon the set of content item text, where a second indication of a first text strength classification is displayed via a content item text interface.

In some examples, an indication of the first text strength classification may be displayed via the content item text interface 502, such as shown in FIGS. 5G-5H. FIG. 5G illustrates a first indication 560 of the first text strength classification being displayed via the content item text interface 502. In the example shown in FIG. 5G, the first text strength classification may correspond to the first classification, the third classification and/or other classification other than the second classification. The first indication 560 may indicate that one or more suggestions (e.g., the one or more first sets of content item text 554), associated with one or more performance metric scores higher than the first performance metric score (and/or the threshold performance metric score), are available for presentation (where the first set of content item text 518 may be modified and/or adjusted based upon the one or more suggestions). The first indication 560 may comprise a selectable input 562 associated with presenting the one or more suggestions.

FIG. 5H illustrates a second indication 564 of the first text strength classification being displayed via the content item text interface 502. In the example shown in FIG. 5H, the first text strength classification corresponds to the second classification. The second indication 564 may indicate that the first set of content item text 518 has a good performance metric and/or that one or more suggestions (that have higher performance metric scores than the first performance metric score and/or the threshold performance metric score) are not available for presentation.

Figure 5I:
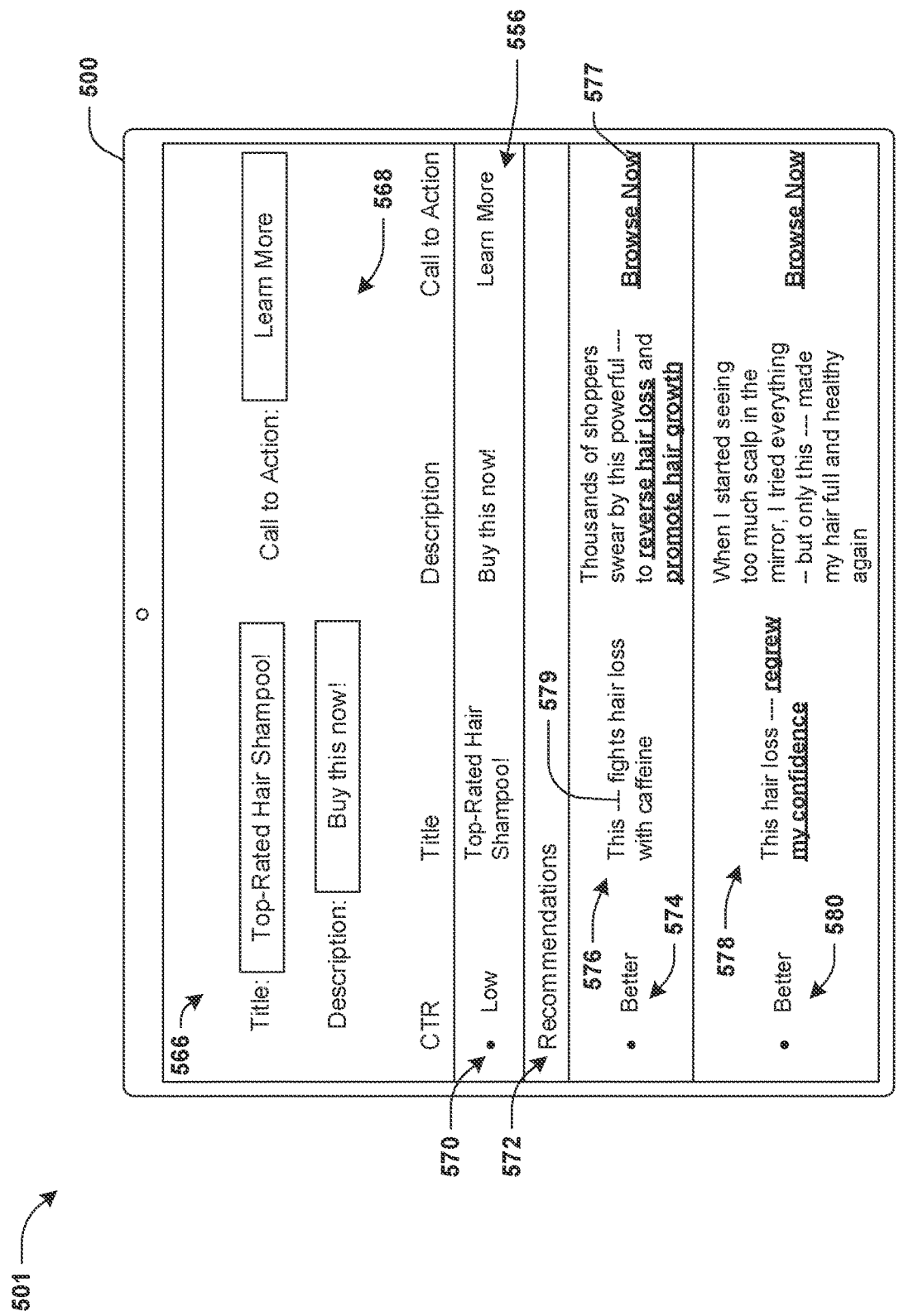
FIG. 5I is a component block diagram illustrating an example system for determining a performance metric score of a set of content item text and/or suggesting one or more sets of content item text based upon the set of content item text, where a content item text suggestion interface is displayed via a content item text interface and/or a first client device.

FIG. 5I illustrates the content item text suggestion interface (shown with reference number 566) being displayed via the content item text interface 502 and/or the first client device 500. In some examples, the content item text suggestion interface 566 is displayed in response to receiving a selection of the selectable input 562 (shown in FIG. 5G). Alternatively and/or additionally, the content item text suggestion interface 566 may be displayed in response to determining that the first text strength classification corresponds to the first classification (and/or in response to determining that performance metric scores associated with the one or more first sets of content item text 554 meet the threshold performance metric score).

In some examples, the content item text suggestion interface 566 may comprise one or more input text fields 568 for at least one of modifying the first set of content item text 518, removing text from the first set of content item text 518, adding new text to the first set of content item text 518, etc. In some examples, the content item text suggestion interface 566 may comprise a third indication 570 of the first text strength classification and/or a representation 556 of the first set of content item text 518. In an example, the third indication 570 may indicate that the first set of content item text 518 has a low relative performance metric (relative to performance metrics of the one or more first sets of content item text 554, for example). In an example, the representation 556 may comprise the title part (e.g., "Top-Rated Hair shampoo!"), the description part (e.g., "Buy this now!") and/or the call to action part (e.g., "Learn More") of the first set of content item text 518.

In some examples, the one or more representations of the content item text suggestion interface 566 may comprise a second representation 576 of a sixth set of content item text of the one or more first sets of content item text 554 and/or a third representation 578 of a seventh set of content item text of the one or more first sets of content item text 554. In an example, the sixth set of content item text may comprise text of a fifth content item and/or the seventh set of content item text may comprise text of a sixth content item. In some examples, the one or more representations (e.g., the second representation 576 and/or the third representation 578) may be displayed in a recommendations list 572 (e.g., a list of one or more recommendations and/or suggestions based upon which the first set of content item text 518 may be modified to achieve a higher performance metric score).

In some examples, one or more portions of the one or more first sets of content item text 554 may be removed (e.g., filtered) to generate the one or more representations. For example, one or more portions of the sixth set of content item text may be removed (e.g., filtered) to generate the second representation 576. In an example, the one or more portions may be removed to anonymize the second representation 576 (such that the second representation 576 does not indicate at least one of a product, a brand, a company, etc. associated with the sixth set of content item text and/or the fifth content item, for example). In an example, a title part of the sixth set of content item text may comprise "This Actair CaffeShampoo fights hair loss with caffeine". The sixth set of content item text may be compared with a plurality of filtered terms, such as comprising brand names, company names, product names, trademarked names, etc. to identify one or more terms of the sixth set of content item text that are comprised in the plurality of filtered terms. In an example, it may be determined that one or more terms of the sixth set of content item text are comprised in the plurality of filtered terms. For example, the one or more terms may comprise a first term "Actair CaffeShampoo". The first term may not be included in the second representation 576 based upon the determination that the first term is comprised in the plurality of filtered terms. In an example, in the second representation 576, the first term may be replaced with a graphical object and/or one or more characters 579, such as one or more symbols (e.g., at least one of one or more hyphens, one or more underscores, etc.) and/or text. Alternatively and/or additionally, the second representation 576 may not comprise the graphical object and/or the one or more characters 579 in place of the first term (e.g., the first term may be removed and/or filtered without including the graphical object and/or the one or more characters 579 in the second representation 576).

In some examples, one or more second portions of the one or more first sets of content item text 554 may be emphasized in the one or more representations. For example, the one or more second portions may comprise a portion 577 of the sixth set of content item text (e.g., the portion 577 may comprise "Browse Now"). In an example, the portion 577 may be emphasized in the second representation 576 based upon a determination that inclusion of the portion 577 in the first set of content item text 518 may cause an increase to the first performance metric score (e.g., adding the portion 577 to the first set of content item text 518 causes an increase to the first performance metric score). In an example, it may be determined that inclusion of the portion 577 in the first set of content item text 518 may cause an increase to the first performance metric score by determining a performance metric score associated with a modified set of content item text (e.g., the performance metric score may be determined using one or more of the techniques provided herein with respect to determining the first performance metric score). The modified set of content item text may be based upon the first set of content item text 518 and the portion 577 (e.g., the modified set of content item text may comprise the first set of content item text 518 and/or the portion 577). The portion 577 may be emphasized in the second representation 576 based upon a determination that the performance metric score meets a second threshold performance metric score. In an example, the second threshold performance metric score may be based upon the first performance metric score. For example, the second threshold performance metric score may be equal to the first performance metric score. Alternatively and/or additionally, the second threshold performance metric score may be higher than the first performance metric score. In an example, the second threshold performance metric score may be determined based upon the first performance metric score and a value. For example, one or more operations (e.g., mathematical operations) may be performed using the first performance metric score and the value to determine the second threshold performance metric score. In an example, the second threshold performance metric score may be equal to the first performance metric score times the value or the first performance metric score plus the value. In an example, the portion 577 may be emphasized in the second representation 576 by at least one of highlighting the portion 577, bolding the portion 577, underlining the portion 577, displaying a graphical object that is adjacent to, underlaying and/or overlaying at least some of the portion 577, etc. such as to distinguish the portion 577 from other portions of the sixth set of content item text (e.g., other portions that are not emphasized). In some examples, in response to a selection of an emphasized portion in a representation of the one or more representation, the first set of content item text 518 may be modified based upon the emphasized portion (e.g., the emphasized portion may be automatically added to and/or incorporated in the first set of content item text 518 in response to a selection of the emphasized portion, such as by clicking on the emphasized portion). In an example, in response to a selection of the portion 577 in the second representation 576, "Browse Now" may be included in the first set of content item text 518 (e.g., the call to action part of the first set of content item text 518 may be changed from "Learn More" to "Browse Now").

In some examples, one or more text options may be generated (e.g., automatically generated) based upon the first set of content item text 518 and the one or more first sets of content item text 554. For example, the one or more text options may be displayed via the content item text suggestion interface 566. In an example, a text option of the one or more text options may comprise a set of text generated based upon the first set of content item text 518 and/or one, some and/or all of the one or more first sets of content item text 554. In an example, the text option may be generated by at least one of removing one or more portions of the first set of content item text 518 (to shorten the first set of content item text 518, for example), adding one or more portions of the one or more first sets of content item text 554 to the first set of content item text 518, replacing a portion of the first set of content item text 518 with text determined based upon the one or more first sets of content item text 554, etc. In some examples, in response to a selection of the text option, the first set of content item text 518 may be modified to the set of text of the text option (and/or the set of text of the text option may be used to generate a content item comprising the set of text).

In some examples, the one or more text options may comprise a text option corresponding to a part (e.g., a title part, a description part and/or a call to action part) of the first set of content item text 518. For example, the text option corresponding to the part may be determined based upon the first set of content item text 518 and/or one, some and/or all of the one or more first sets of content item text 554. In some examples, the text option may be generated to comprise text corresponding to a title part, text corresponding to a description part, text corresponding to a call to action part, or text corresponding to another content item text part. In an example, the first set of content item text 518 may be associated with gaming (e.g., the first set of content item text 518 may be for a game advertisement), and/or the text option may correspond to a call to action part "Play Now" (e.g., the text option comprising the call to action part "Play Now" may be generated and/or displayed based upon a determination that a "Play Now" call to action results in a higher performance metric score than a call to action part of the first set of content item text 518). Alternatively and/or additionally, in an example in which the text option corresponds to a call to action part, a plurality of call to action parts (generated based upon the one or more first sets of content item text 554 and/or one or more other sets of content item text, for example) may be ranked by performance metric score (e.g., at least one of CTR, conversion rate, etc.) and/or the text option may be generated based upon a top ranked call to action part of the plurality of call to action parts. In some examples, in response to a selection of the text option, a portion of the first set of content item text 518 may be changed to the text option. In an example in which the text option corresponds to a call to action part, the portion of the first set of content item text 518 that is changed to the text option may correspond to a call to action part of the first set of content item text 518.

In some examples, such as shown in FIG. 5I, the content item text suggestion interface 566 may comprise one or more indications that the one or more first performance metric scores associated with the one or more first sets of content item text 554 are at least one of higher than the first performance metric score, higher than the threshold performance metric score, etc. For example, the one or more indications may comprise an indication 574 and/or an indication 580.

Figure 5J:
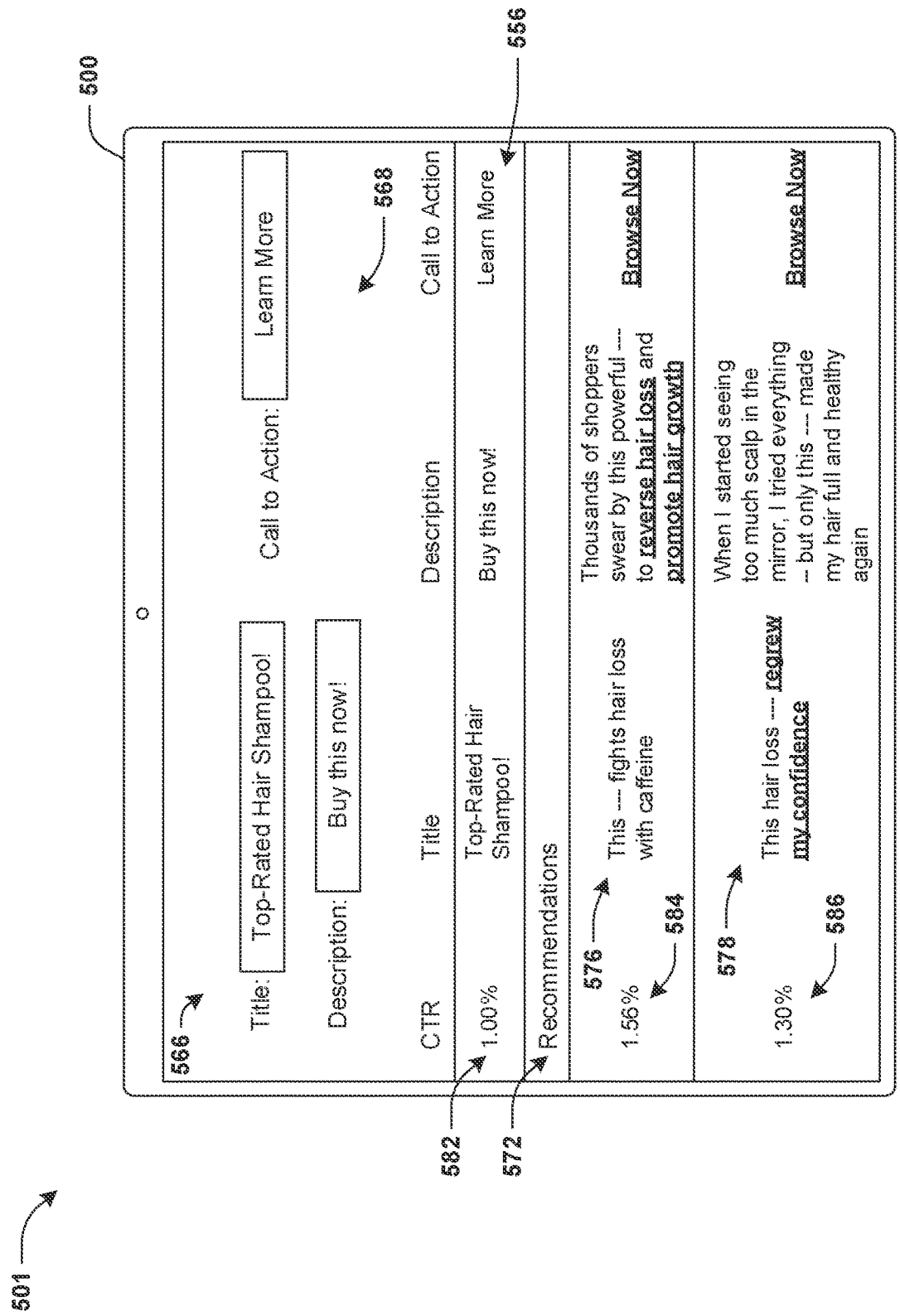
FIG. 5J is a component block diagram illustrating an example system for determining a performance metric score of a set of content item text and/or suggesting one or more sets of content item text based upon the set of content item text, where a content item text suggestion interface is displayed via a content item text interface and/or a first client device.

In some examples, such as shown in FIG. 5J, the content item text suggestion interface 566 may comprise an indication 582 of the first performance metric score and/or one or more indications of the one or more first performance metric scores associated with the one or more first sets of content item text 554. For example, the one or more indications may comprise an indication 584 and/or an indication 586.

Figure 5K:
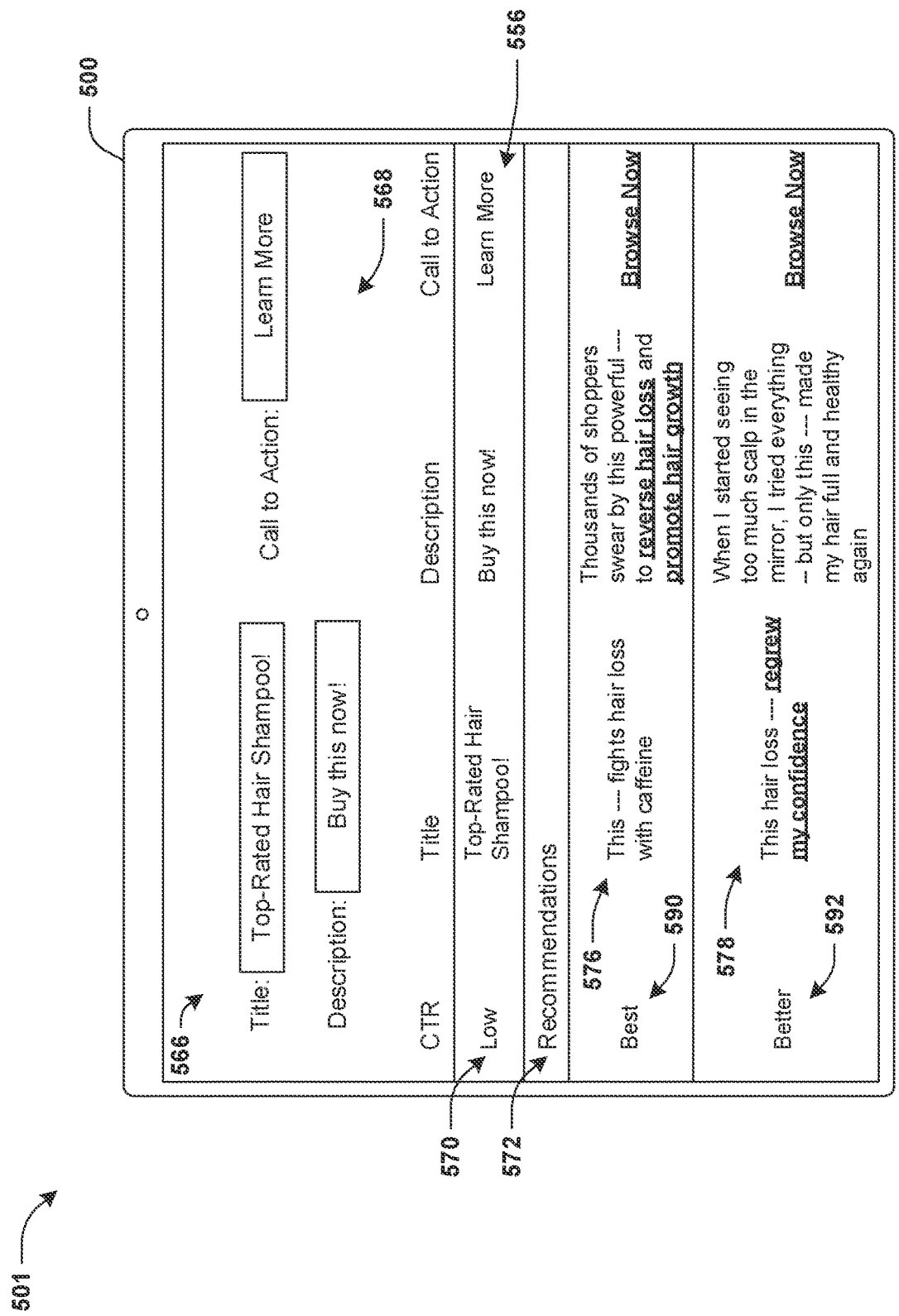
FIG. 5K is a component block diagram illustrating an example system for determining a performance metric score of a set of content item text and/or suggesting one or more sets of content item text based upon the set of content item text, where a content item text suggestion interface is displayed via a content item text interface and/or a first client device.

In some examples, such as shown in FIG. 5K, the content item text suggestion interface 566 may comprise one or more level-based indications associated with the one or more first sets of content item text 554. A level-based indication of the one or more level-based indications may be based upon a performance metric level of a performance metric score of the one or more first performance metric scores, where the performance metric level may be relative to and/or based upon the first performance metric score and/or one or more other performance metric scores of the one or more first performance metric scores. In an example, the one or more level-based indications may comprise a first level-based indication 590 associated with the sixth set of content item text and/or a second level-based indication 592 associated with the seventh set of content item text. The first level-based indication 590 may indicate a first performance metric level (e.g., "Best") of a performance metric score associated with the sixth set of content item text and/or may indicate that the performance metric score associated with the sixth set of content item text is higher than the first performance metric score and/or higher than a performance metric score associated with the seventh set of content item text. The second level-based indication 592 may indicate a second performance metric level (e.g., "Better") of a performance metric score associated with the seventh set of content item text and/or may indicate that the performance metric score associated with the seventh set of content item text is higher than the first performance metric score and/or lower than a performance metric score associated with the sixth set of content item text.

Level-based indications (displayed by content item text suggestion interface 566, for example) may be granular. In some examples, level-based indications may comprise at least one of terms (e.g., good, better, much better, best, etc.), symbols, characters, images, etc. indicating different performance metric levels. In some examples, level-based indications may use rating and/or ranking scales to indicate performance metric levels (e.g., star classification, numeric rating scale, etc.). In an example, a level-based indication representative of a higher rating and/or ranking (e.g., 5 out of 5, 5-star rating, 100%, best, etc.) indicates a performance level that is higher than a performance level indicated by a level-based indication representative of a lower rating and/or ranking (e.g., 1 out of 5, 1-star rating, 20%, good, etc.).

In an example, one or more performance metric levels indicated by the one or more level-based indications may be determined based upon the first performance metric score associated with the first set of content item text 518 and/or the one or more first performance metric scores associated with the one or more first sets of content item text 554. In an example, each performance metric level of the one or more performance metric levels may correspond to a performance metric score range (e.g., a level-based indication of the one or more level-based indications may be indicative of the performance metric level based upon a determination that a performance metric score associated with a corresponding set of content item text is within the performance metric score range). In an example, a size of a performance metric score range (e.g., a difference between a highest performance metric score of the performance metric score range and a lowest performance metric score of the performance metric score range) of a performance metric level of the one or more performance metric levels may be determined based upon the first performance metric score and/or the one or more first performance metric scores (e.g., the size may be equal to $(score_1 - score_2)/score_1$, wherein $score_1$ may correspond to the first performance metric score and/or $score_2$ may correspond to combination, such as at least one of an average, a median, etc., of the one or more first performance metric scores).

In some examples, an eighth set of content item text may be received (from the first client device 500, for example) via the content item text interface 502 and/or the content item text suggestion interface 566. In some examples, the first set of content item text 518 may be modified and/or adjusted (based upon the one or more representations, for example) to generate the eighth set of content item text. In an example, the first set of content item text 518 may be modified and/or adjusted via the content item text interface 502 and/or the suggestion content item text suggestion interface 566 (such as using the one or more input text fields 568) to generate the eighth set of content item text. In some examples, a second performance metric score associated with the eighth set of content item text may be determined (such as using one or more of the techniques provided herein with respect to determining the first performance metric score associated with the first set of content item text 518). In some examples, a fourth plurality of sets of content item text may be selected from among the second plurality of sets of content item text (such as using one or more of the techniques provided herein with respect to selecting the third plurality of sets of content item text 552 from among the second plurality of sets of content item text). For example, the fourth plurality of sets of content item text may be selected based upon similarity scores (determined based upon the eighth set of content item text and/or the second plurality of sets of content item text, for example) associated with similarities between the eighth set of content item text and sets of content item text of the second plurality of sets of content item text. Alternatively and/or additionally, the fourth plurality of sets of content item text may be selected by performing NNS using one or more k-NN techniques and/or one or more approximate nearest neighbors techniques. In some examples, a third threshold performance metric score may be compared with performance metric scores associated with the fourth plurality of sets of content item text to determine whether the performance metric scores comprise a performance metric score that meets the third threshold performance metric score. The third threshold performance metric score may be determined based upon the second performance metric score (such as using one or more of the techniques provided herein with respect to determining the threshold performance metric score based upon the first performance metric score). Alternatively and/or additionally, the performance metric scores associated with the fourth plurality of sets of content item text may be determined using one or more of the techniques provided herein with respect to determining the plurality of performance metric scores.

In an example, a second text strength classification of the eighth set of content item text may be determined. In some examples, an indication of the second text strength classification may be displayed via the content item text interface 502 (such as using one or more of the techniques provided herein, such as shown in FIGS. 5G-5H, with respect to displaying the first indication 560 or the second indication 564 of the first text strength classification).

In some examples, the second text strength classification may be determined based upon the comparison of the third threshold performance metric score with the performance metric scores associated with the fourth plurality of sets of content item text. In an example, the second text strength classification may correspond to the first classification if the performance metric scores comprise a performance metric score that meets the third threshold performance metric score (e.g., if the fourth plurality of sets of content item text comprise a set of content item text associated with a performance metric score that meets the third threshold performance metric score). Alternatively and/or additionally, if the second text strength classification corresponds to the first classification (and/or if the performance metric scores comprise a performance metric score that meets the third threshold performance metric score), the content item text suggestion interface 566 comprising one or more second representations of one or more second sets of content item text may be displayed via the content item text interface and/or the first client device 500, wherein the one or more second sets of content item text are associated with one or more second performance metric scores that meet the third threshold performance metric score. The one or more second sets of content item text may be selected for presentation using one or more of the techniques provided herein with respect to selecting the one or more first sets of content item text 554.

Alternatively and/or additionally, the second text strength classification may correspond to the second classification if the performance metric scores do not comprise a performance metric score that meets the third threshold performance metric score (e.g., if the fourth plurality of sets of content item text do not comprise a set of content item text associated with a performance metric score that meets the third threshold performance metric score). Alternatively and/or additionally, if the second text strength classification corresponds to the second classification (and/or if the performance metric scores do not comprise a performance metric score that meets the third threshold performance metric score), one or more second representations of one or more second sets of content item text may not be displayed via the content item text suggestion interface 566, the content item text interface and/or the first client device 500.

Figure 5L:
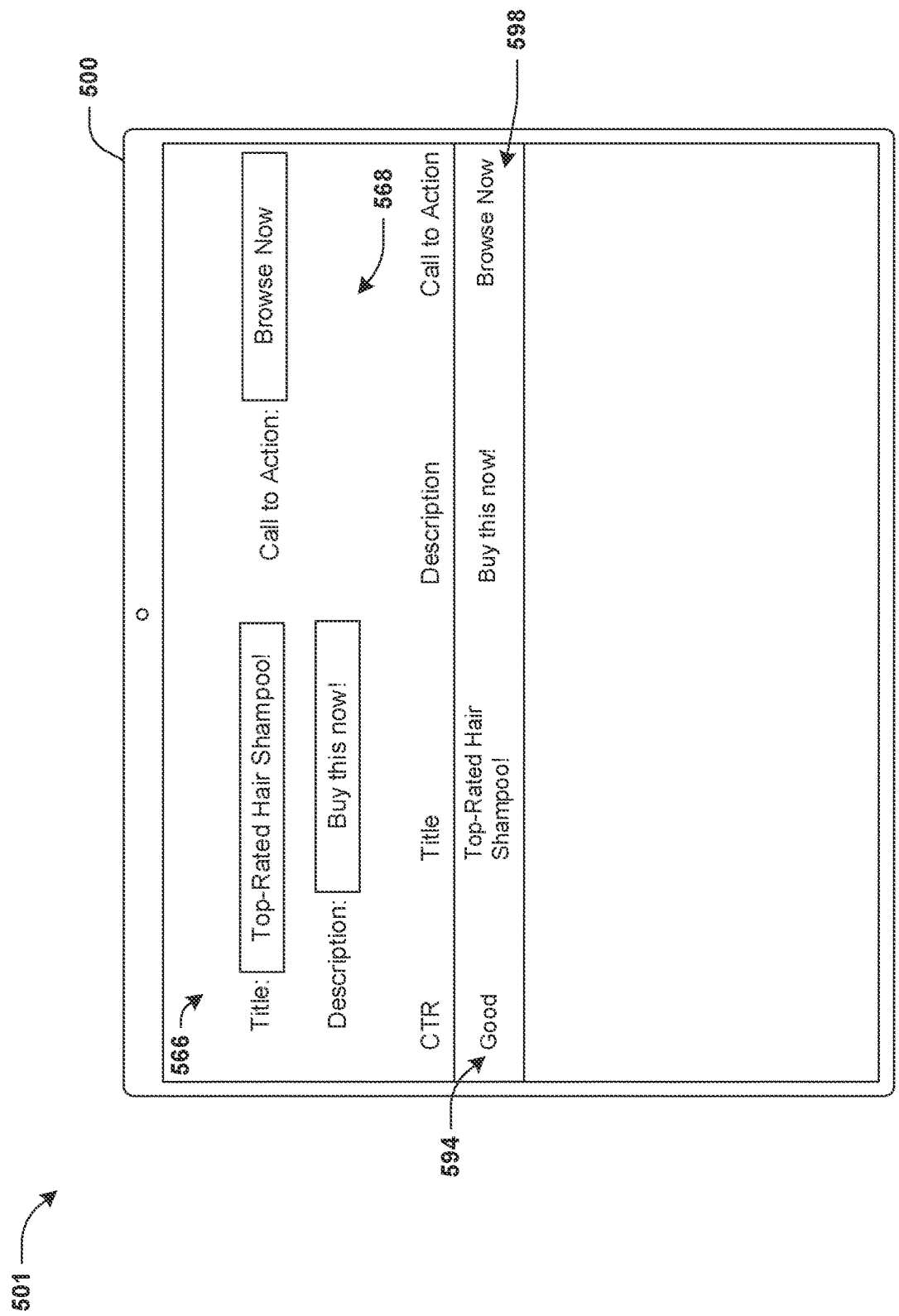
FIG. 5L is a component block diagram illustrating an example system for determining a performance metric score of a set of content item text and/or suggesting one or more sets of content item text based upon the set of content item text, where a content item text suggestion interface is displayed via a content item text interface and/or a first client device.

FIG. 5L illustrates an indication 594 of the second text strength classification being displayed via the content item text suggestion interface 566. In the example shown in FIG. 5L, the second text strength classification corresponds to the second classification. The indication 594 of the second text strength classification may indicate that the eighth set of content item text has a good performance metric and/or that one or more suggestions (that have higher performance metric scores than the second performance metric score and/or the third threshold performance metric score) are not available for presentation. The content item text suggestion interface 566 may display a representation 598 of the eighth set of content item text.

In some examples, the content item text interface 502 and/or the content item text suggestion interface 566 may display a historical text interface (such as in response to receiving a selection of a selectable input associated with displaying the historical text interface). In an example, the historical text interface may comprise representations of sets of content item text input via the content item text interface 502 and/or the content item text suggestion interface 566. For example, the sets of content item text may be input via the content item text interface 502 and/or the content item text suggestion interface 566 during an activity session of the content item text interface 502 and/or the content item text suggestion interface 566. In an example, the sets of content item text may comprise the first set of content item text 518 and/or the eighth set of content item text. The representations of the sets of content item text may be ranked based upon performance metric scores (comprising the first performance metric score and/or the second performance metric score, for example) determined based upon the sets of content item text to determine rankings associated with the sets of content item text. For example, the representations may be arranged based upon the rankings (e.g., such that a representation of a set of content item text with a higher performance metric score is arranged above and/or higher than a representation of a set of content item text with a lower performance metric score). In some examples, the historical text interface may indicate (and/or emphasize) differences between the sets of content item text.

Figure 5M:
FIG. 5M is a component block diagram illustrating an example system for determining a performance metric score of a set of content item text and/or suggesting one or more sets of content item text based upon the set of content item text, where a seventh content item is generated.

In some examples, a seventh content item (e.g., an advertisement) may be generated based upon the eighth set of content item text. For example, the seventh content item may be generated in response to a request to generate the seventh content item. In an example, the request to generate the seventh content item may be received via a selection of the selectable input 510 (shown in FIG. 5A) and/or via a selection of a selectable input (not shown) of the content item text suggestion interface 566. In some examples, the seventh content item may be generated to comprise the eight set of content item text and/or one or more graphical objects (e.g., one or more images selected and/or received via the content item text interface 502). In some examples, the one or more graphical objects may be analyzed to determine a performance metric score associated with the one or more graphical objects. In response to determining that the performance metric score is less than a fourth threshold performance metric score, an indication may be displayed (via the content item text interface 502 and/or the content item text suggestion interface 566, for example). For example, the indication may indicate that the performance metric score of the one or more graphical objects is less than the fourth threshold performance metric score and/or may suggest using one or more different graphical objects for generating the seventh content item. Alternatively and/or additionally, the seventh content item may be generated based upon sizing information (e.g., sizing information selected and/or received via the content item text interface 502). FIG. 5M illustrates generation of the seventh content item (shown with reference number 596). The seventh content item 596 may comprise the eighth set of content item text and/or a graphical object (e.g., an image of a shampoo bottle advertised by the seventh content item 596, for example).

In some examples, the seventh content item 596 may be presented via client devices. For example, in response to receiving a request for content (e.g., an advertisement request) from a second client device, the seventh content item 596 may be presented via the second client device. In some examples, in response to receiving the request for content from the second client device, an auction and/or a bidding process may be performed to select content for presentation via the second client device. For example, the seventh content item 596 may be selected, from among content items participating in the auction and/or the bidding process, for presentation via the second client device. In some examples, in response to selecting the seventh content item 596, the seventh content item 596 may be presented via the second client device. For example, the seventh content item 596 may be presented as an advertisement on an internet resource accessed by the second client device, such as in conjunction with non-advertisement content on the internet resource.

Alternatively and/or additionally, multiple sets of content item text comprising the eighth set of content item text may be received (via the content item text interface 502 and/or the content item text suggestion interface 566, for example). The multiple sets of content item text may be selected (via the content item text interface 502 and/or the content item text suggestion interface 566, for example) for presentation via client devices (in response to receiving requests for content, for example). In some examples, in response to receiving the request for content from the second client device, a set of content item text of the multiple sets of content item text may be selected for inclusion in the auction and/or the bidding process (and/or for presentation via the second client device). For example, the set of content item text may be selected based upon at least one of user demographic information associated with the second client device (such as determined based upon the request for content) and/or a content item format indicated by the request for content. In some examples, in response to selecting the set of content item text, a content item comprising the set of content item text may be included in the auction and/or the bidding process and/or the content item may be presented via the second client device.

In some examples, a set of content item text (e.g., a set of content item text input via the content item text interface 502 and/or the content item text suggestion interface 566, such as at least one of the first set of content item text 518, the eighth set of content item text, etc.) may be analyzed to determine whether the set of content item text meets one or more content policy guidelines. For example, in response to a determination that the set of content item text may not meet one or more content policy guidelines (such as based upon a determination that the set of content item text contains an offensive term of a list of offensive terms), an indication (e.g., a text rejection waning) may be displayed (via the content item text interface 502 and/or the content item text suggestion interface 566, for example). For example, the indication may indicate that the set of content item text may not meet one or more content policy guidelines. Alternatively and/or additionally, a content item (e.g., the seventh content item 596) comprising the set of content item text may not be generated based upon a determination that the set of content item text may not meet one or more content policy guidelines. Alternatively and/or additionally, a content item (e.g., the seventh content item 596) comprising the set of content item text may not be presented via client devices and/or may not be included in an auction and/or a bidding process based upon a determination that the set of content item text may not meet one or more content policy guidelines.

In some examples, content item information (e.g., information input via the content item text interface 502 and/or the content item text suggestion interface 566 for generating a content item, such as information comprising at least one of a set of content item text, an image, a video, etc.) may be analyzed to determine whether the content item information meets one or more content policy guidelines. For example, in response to a determination that the content item information may not meet one or more content policy guidelines (such as based upon a determination that a set of content item text of the content item information contains an offensive term of a list of offensive terms, and/or based upon a determination that a video and/or an image of the content item information comprises offensive content), an indication (e.g., a creative rejection waning) may be displayed (via the content item text interface 502 and/or the content item text suggestion interface 566, for example). For example, the indication may indicate that the content item information may not meet one or more content policy guidelines. Alternatively and/or additionally, a content item (e.g., the seventh content item 596) may not be generated using the content item information based upon a determination that the content item information may not meet one or more content policy guidelines. Alternatively and/or additionally, a content item (e.g., the seventh content item 596) generated using the content item information may not be presented via client devices and/or may not be included in an auction and/or a bidding process based upon a determination that the content item information may not meet one or more content policy guidelines.

Although various examples of the present disclosure are described with respect to content item text in the English language, embodiments are contemplated in which the content item text comprises any language.

In one embodiment in which a first language of input text (e.g., the first set of content item text 518) is different than a second language supported by a model (e.g., the first machine learning model 528), the input text may be translated (e.g., automatically translated) to generate translated input text in the second language. The translated input text may be used to identify one or more suggested sets of content item text (e.g., the one or more first sets of content item text 554), such as using one or more of the techniques provided herein with respect to determining the one or more first sets of content item text 554 based upon the first set of content item text 518. For example, a performance metric score may be determined (using the first machine learning model 528, for example) based upon the translated input text. The one or more suggested sets of content item text may be translated into the first language and/or displayed via the content item text suggestion interface 566.

Although various examples of the present disclosure are described with respect to content item text of content items comprising advertisements, embodiments are contemplated in which the content items comprise any type of content, such as at least one of search results, news headlines, articles, social media feeds, suggested content (e.g., links to videos, audio, articles, social media feeds, etc.), etc. while staying within the scope of the present disclosure.

It may be appreciated that the disclosed subject matter may assist a user (and/or a device associated with the user) in producing content item text and/or generating a content item comprising the content item text. Alternatively and/or additionally, the disclosed subject matter may assist the user (and/or the device) in efficiently and/or quickly displaying and/or viewing one or more sets of content item text (e.g., similar sets of content item text that are contextually similar to a set of content item text input via the device) that have higher performance metric scores than the set of content item text input via the device. Thus, the disclosed subject matter may assist the user (and/or the device) in efficiently and/or quickly modifying and/or improving the content item text to generate a modified set of content item text based upon the one or more sets of content item text, where a content item generated based upon the modified set of content item text may have improved performance (e.g., improved CTR, improved conversion rate, etc.) as compared to a content item comprising the first set of content item text.

Implementation of at least some of the disclosed subject matter may lead to benefits including, but not limited to, an improved interface, a reduction in screen space and/or an improved usability of a display (e.g., of the device) (e.g., as a result of identifying the one or more sets of content item text in response to receiving the set of content item text input via the device, as a result of using the device to display one or more representations of the one or more sets of content item text (such as concurrently with the set of content item text input via the device), as a result of displaying one or more input text fields associated with modifying and/or editing the set of content item text input via the device (such as concurrently with the one or more representations), as a result of enabling the user to modify the set of content item text while the one or more representations are displayed, wherein separate applications and/or separate windows may not need to be opened in order to perform research to find the one or more sets of content item text, wherein separate applications and/or separate windows may not need to be opened in order to display the one or more representations, wherein separate applications and/or separate windows may not need to be opened in order to edit the set of content item text input via the device, etc.).

Alternatively and/or additionally, implementation of at least some of the disclosed subject matter may lead to benefits including an increase in generalized revenue for presenting content items via client devices (e.g., as a result of the set of content item text being modified based upon the one or more sets of content item text to generate a modified set of content item text, wherein a content item comprising the modified set of content item text may have improved performance (e.g., improved CTR, improved conversion rate, etc.) as compared to a content item comprising the first set of content item text, etc.).

Alternatively and/or additionally, implementation of at least some of the disclosed subject matter may lead to benefits including a reduction in bandwidth (e.g., as a result of reducing a need for the user to search throughout the internet and/or navigate through internet content to find the one or more sets of content item text, etc.).

In some examples, at least some of the disclosed subject matter may be implemented on a client device, and in some examples, at least some of the disclosed subject matter may be implemented on a server (e.g., hosting a service accessible via a network, such as the Internet).

Figure 6:
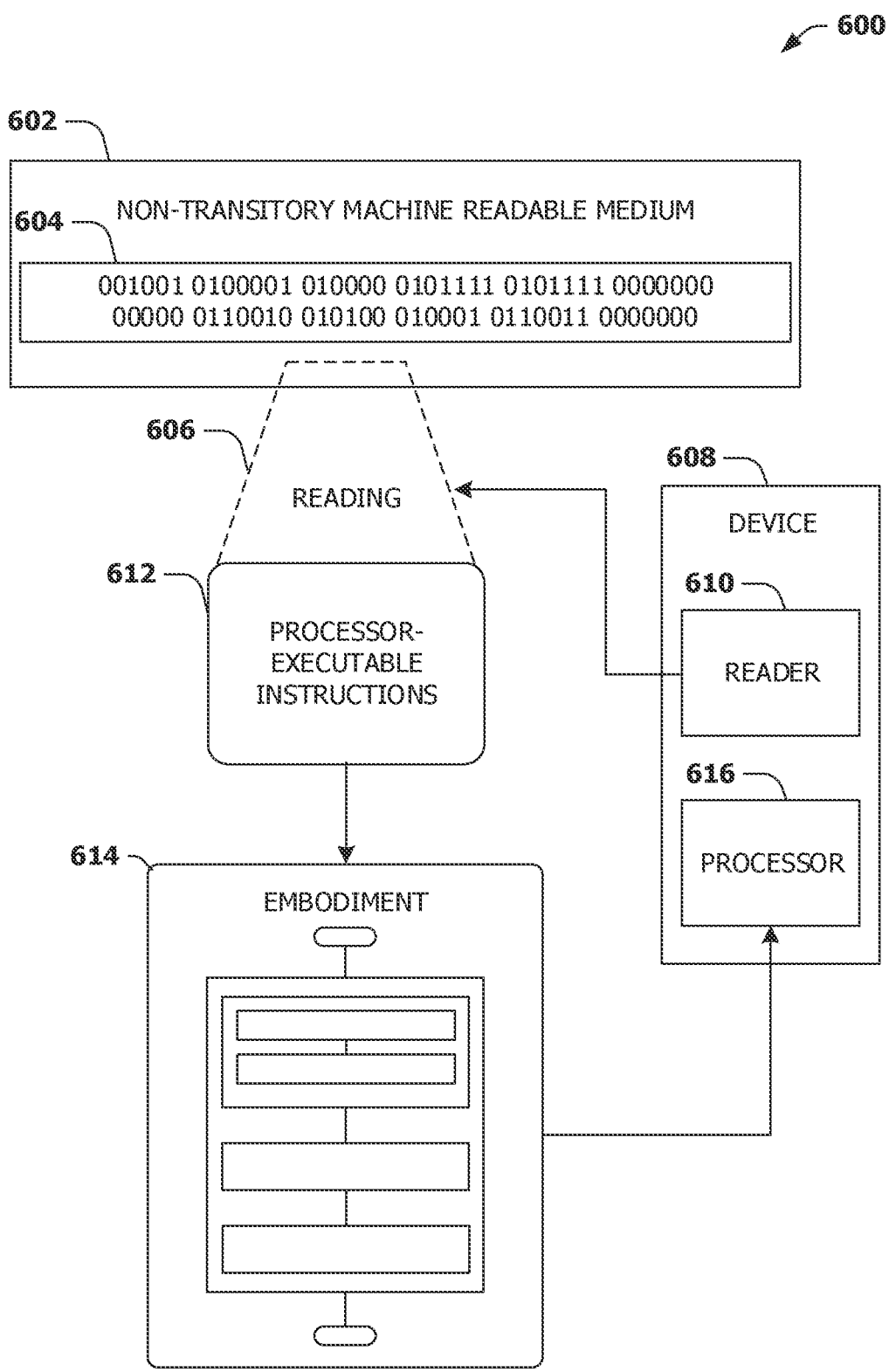
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the example system 501 of FIGS. 5A-5M, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
displaying a content item text interface via a client device;
receiving, via the content item text interface, a first set of content item text;
determining, based upon the first set of content item text, a first performance metric score;
determining, based upon the first set of content item text and a plurality of sets of content item text associated with a plurality of content items, a plurality of similarity scores associated with the plurality of sets of content item text, wherein:
the plurality of sets of content item text comprises a second set of content item text of a first content item of the plurality of content items; and
a first similarity score of the plurality of similarity scores is associated with a similarity between the first set of content item text and the second set of content item text;
selecting, based upon the plurality of similarity scores and a plurality of performance metric scores associated with the plurality of sets of content item text, one or more sets of content item text from among the plurality of sets of content item text, wherein:
the plurality of performance metric scores comprises one or more performance metric scores associated with the one or more sets of content item text; and
the one or more performance metric scores are higher than the first performance metric score;
determining, based upon the first performance metric score and the one or more performance metric scores associated with the one or more sets of content item text, a text strength classification of the first set of content item text, wherein the text strength classification corresponds to a first classification based upon a determination of whether the one or more performance metric scores meet a threshold performance metric score based upon the first performance metric score; and
displaying, via the client device, at least one of one or more representations of the one or more sets of content item text or an indication of the text strength classification.

2. The method of claim 1, wherein:
the determining the first performance metric score is performed using a first machine learning model.

3. The method of claim 2, comprising:
training a machine learning model using first training data to generate the first machine learning model, wherein the first training data comprises a second plurality of sets of content item text associated with a second plurality of content items and a plurality of sets of content event information associated with the second plurality of content items.

4. The method of claim 3, wherein:
the plurality of sets of content event information comprises a first set of content event information associated with a second content item; and
the first set of content event information is indicative of first content event information associated with first content events performed via one or more first internet resources corresponding to a first entity, wherein a content event of the first content events corresponds to presentation of the second content item via an internet resource of the one or more first internet resources.

5. The method of claim 4, comprising:
receiving, via the content item text interface, an indication of the first entity, wherein the determining the first performance metric score is performed based upon the first entity.

6. The method of claim 3, wherein:
the first machine learning model comprises at least one of a linear model, a logistic regression model, a naïve Bayes logistic regression (NBLR) model or a deep learning model.

7. The method of claim 1, comprising:
determining a first embedding-based representation of the first set of content item text, wherein the determining the plurality of similarity scores comprises determining the first similarity score based upon the first embedding-based representation and a second embedding-based representation of the second set of content item text of the first content item.

8. The method of claim 1, wherein:
the displaying the one or more representations of the one or more sets of content item text is performed responsive to a determination that each performance metric score of the one or more performance metric scores meets the threshold performance metric score.

9. The method of claim 1, wherein the selecting the one or more sets of content item text from among the plurality of sets of content item text comprises:
selecting, based upon the plurality of similarity scores, a second plurality of sets of content item text from among the plurality of sets of content item text based upon a determination that the second plurality of sets of content item text are associated with highest similarity scores of the plurality of similarity scores; and
selecting the one or more sets of content item text from among the second plurality of sets of content item text based upon a determination that each performance metric score of the one or more performance metric scores meets the threshold performance metric score.

10. The method of claim 1, comprising:
displaying one or more indications of the one or more performance metric scores associated with the one or more sets of content item text.

11. The method of claim 1, comprising:
displaying one or more indications that the one or more performance metric scores associated with the one or more sets of content item text are higher than the first performance metric score.

12. The method of claim 1, wherein:
the displaying the indication of the text strength classification is performed responsive to a determination that each performance metric score of the one or more performance metric scores meets the threshold performance metric score.

13. The method of claim 1, comprising:
receiving a third set of content item text;
determining, based upon the third set of content item text, a second performance metric score;
determining, based upon the third set of content item text and a second plurality of sets of content item text associated with a second plurality of content items, a second plurality of similarity scores associated with the second plurality of sets of content item text, wherein:

the second plurality of sets of content item text comprises a fourth set of content item text of a second content item of the second plurality of content items; and a second similarity score of the second plurality of similarity scores is associated with a similarity between the third set of content item text and the fourth set of content item text;

selecting, based upon the second plurality of similarity scores, a third plurality of sets of content item text from among the second plurality of sets of content item text based upon a determination that the third plurality of sets of content item text are associated with highest similarity scores of the second plurality of similarity scores;

comparing a second threshold performance metric score with performance metric scores associated with the third plurality of sets of content item text to determine whether the performance metric scores comprise a performance metric score that meets the second threshold performance metric score, wherein the second threshold performance metric score is based upon the second performance metric score; and determining, based upon the comparing the second threshold performance metric score with the performance metric scores, a second text strength classification of the third set of content item text, wherein:

the second text strength classification corresponds to a second classification based upon a determination that the performance metric scores do not comprise a performance metric score that meets the second threshold performance metric score; and the second classification is different than the first classification.

14. The method of claim 13, comprising:
displaying an indication of the second text strength classification.

15. A computing device comprising:
a processor; and
memory comprising processor-executable instructions that when executed by the processor cause performance of operations, the operations comprising:
displaying a content item text interface via a client device;
receiving, via the content item text interface, a first set of content item text;
determining, based upon the first set of content item text, a first performance metric score;
determining, based upon the first set of content item text and a plurality of sets of content item text associated with a plurality of content items, a plurality of similarity scores associated with the plurality of sets of content item text, wherein:
the plurality of sets of content item text comprises a second set of content item text of a first content item of the plurality of content items; and
a first similarity score of the plurality of similarity scores is associated with a similarity between the first set of content item text and the second set of content item text;
selecting, based upon the plurality of similarity scores and a plurality of performance metric scores associated with the plurality of sets of content item text, one or more sets of content item text from among the plurality of sets of content item text, wherein:

the plurality of performance metric scores comprises one or more performance metric scores associated with the one or more sets of content item text; and the one or more performance metric scores are higher than the first performance metric score;

determining, based upon the first performance metric score and the one or more performance metric scores associated with the one or more sets of content item text, a text strength classification of the first set of content item text, wherein the text strength classification corresponds to a first classification based upon a determination of whether the one or more performance metric scores meet a threshold performance metric score based upon the first performance metric score; and displaying, via the client device, at least one of one or more representations of the one or more sets of content item text or an indication of the text strength classification.

16. The computing device of claim 15, wherein:
the determining the first performance metric score is performed using a first machine learning model.

17. The computing device of claim 16, the operations comprising:
training a machine learning model using first training data to generate the first machine learning model, wherein the first training data comprises a second plurality of sets of content item text associated with a second plurality of content items and a plurality of sets of content event information associated with the second plurality of content items.

18. The computing device of claim 17, wherein:
the plurality of sets of content event information comprises a first set of content event information associated with a second content item; and the first set of content event information is indicative of first content event information associated with first content events performed via one or more first internet resources corresponding to a first entity, wherein a content event of the first content events corresponds to presentation of the second content item via an internet resource of the one or more first internet resources.

19. The computing device of claim 18, the operations comprising:
receiving, via the content item text interface, an indication of the first entity, wherein the determining the first performance metric score is performed based upon the first entity.

20. A non-transitory machine readable medium having stored thereon processor-executable instructions that when executed cause performance of operations, the operations comprising:
receiving, from a client device, a first set of content item text;
determining, based upon the first set of content item text, a first performance metric score;
determining, based upon the first set of content item text and a plurality of sets of content item text associated with a plurality of content items, a plurality of similarity scores associated with the plurality of sets of content item text, wherein:
the plurality of sets of content item text comprises a second set of content item text of a first content item of the plurality of content items; and a first similarity score of the plurality of similarity scores is associated with a similarity between the first set of content item text and the second set of content item text;

selecting, based upon the plurality of similarity scores and a plurality of performance metric scores associated with the plurality of sets of content item text, one or more sets of content item text from among the plurality of sets of content item text, wherein:
the plurality of performance metric scores comprises one or more performance metric scores associated with the one or more sets of content item text; and
the one or more performance metric scores are higher than the first performance metric score;

determining, based upon the first performance metric score and the one or more performance metric scores associated with the one or more sets of content item text, a text strength classification of the first set of content item text, wherein the text strength classification corresponds to a first classification based upon a determination of whether the one or more performance metric scores meet a threshold performance metric score based upon the first performance metric score; and displaying, via the client device, at least one of one or more representations of the one or more sets of content item text or an indication of the text strength classification.

* * * * *